(12) United States Patent
Hunter et al.

(10) Patent No.: US 6,298,327 B1
(45) Date of Patent: Oct. 2, 2001

(54) EXPERT SUPPORT SYSTEM FOR AUTHORING INVENTION DISCLOSURES

(75) Inventors: Robert M. Hunter; Frank M. Stewart, both of Bozeman, MT (US)

(73) Assignee: YES Technologies, Kamuela, HI (US)

(*) Notice: Subject to any disclaimer, the term of this patent is extended or adjusted under 35 U.S.C. 154(b) by 0 days.

(21) Appl. No.: 08/401,141

(22) Filed: Mar. 8, 1995

(51) Int. Cl.⁷ .................................................. G06F 157/00
(52) U.S. Cl. ................................................ 705/1; 345/340
(58) Field of Search .............................. 395/201; 705/1; 707/1–6, 530, 531, 10; 704/1, 4, 9

(56) References Cited

U.S. PATENT DOCUMENTS 5,754,840 * 5/1998 Rivette et al. .
5,774,833 * 6/1998 Newman ................................... 704/9

OTHER PUBLICATIONS

Pressman, David; Patent it Yourself Software User's Guide; Nolo Press; entire document.

* cited by examiner

*Primary Examiner*—Frantzy Poinvil
(74) *Attorney, Agent, or Firm*—Robert M. Hunter

(57) ABSTRACT

A computer-implemented expert support system for authoring invention disclosures and for evaluating the probable patentability and marketability of a disclosed invention. The system comprises at least a computer, an input device, an output device, and software program. The software program is developed whith an object-oriented design process and is implemented in an object-oriented computer language such as C++. The system facilitates communication of invention characteristics and enables output of invention disclosures in a plurality of formats, including that of a patent application.

16 Claims, 8 Drawing Sheets

Microfiche Appendix Included
(20 Microfiche, 1937 Pages)

US 6,298,327 B1

EXPERT SUPPORT SYSTEM FOR AUTHORING INVENTION DISCLOSURES

STATEMENT AS TO RIGHTS IN INVENTIONS MADE UNDER FEDERALLY-SPONSORED RESEARCH AND DEVELOPMENT

This invention was made with Government support under Small Business Innovation Research Award No. 1 R43 GM50907-01, awarded by the National Institute of General Medical Sciences, a component of the U.S. Department of Health and Human Services. The Government has certain rights in the invention.

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND OF THE INVENTION

A microfiche appendix consisting of 20 microfiche and of 1,937 frames is included as part of the specification.

The background of the invention is set forth in two parts: the field of the invention and the description of related art.

1. Field of the Invention

This invention relates to a computer-implemented expert support system for authoring invention disclosures.

2. Description of Related Art

Prior-art, knowledge-based software systems serve a variety of purposes. U.S. Pat. No. 4,675,829 discloses a method and apparatus for performing inheritance in knowledge-based systems. U.S. Pat. No. 4,839,822 discloses an expert system which provides one or more suggested treatments for a patient with physical trauma. U.S. Pat. No. 4,943,933 discloses a method and apparatus for handling definitions of relationships between knowledge and data in a database used as the knowledge of an expert system. U.S. Pat. No. 4,945,476 discloses a knowledgebase having particular utility as a medical/pathology knowledgebase containing textual and pictorial information on various diseases. U.S. Pat. No. 5,025,392 discloses an apparatus and method for providing a microcomputer-based expert system having a knowledgebase of failure analysis of metals. U.S. Pat. No. 5,043,915 discloses an inference system provided with a first knowledgebase for storing general knowledge which is a theorem, and a second knowledgebase for storing associative knowledge which is different in knowledge structure from the general knowledge. U.S. Pat. No. 5,051,932 discloses a system for controlling a process exhibiting both linear and non-linear behavior. U.S. Pat. No. 5,067,148 discloses an expert system for planning telephone facilities networks. The disclosures of the above patents are incorporated by reference herein as if fully set forth.

A variety of publications and software programs are used by inventors in authoring invention disclosures. Some inventors use forms provided by their technology managers, supplemented by library research findings as guidance during preparation of invention disclosures. Practitioners of rDNA technology use the DOS version of AuthorIn sequence input software or PatentIn sequence-input software.

A number of books and two software products are available to assist novice inventors in preparing U.S. patent applications. The book *Patent It Yourself* by Robert Pressman (Pressman, R. *Patent It Yourself*. Berkeley, Calif.: Nolo Press, 1995) is highly regarded by many. "Patent Writer" software is available as DOS shareware from World Permission Software (*Patent Writer. User's Manual V.* 2.00. Long Beach, Calif.: World Permission Software, 1992).

A Windows software product for authoring of U.S. patent applications called "Patent It Yourself" is published by Nolo Press (*Patent It Yourself*, Version 1.0. Berkeley, Calif.: Nolo Press, 1994). The software contains an on-line version of Robert Pressman's book and "the forms and instructions needed to patent a product in the United States." This product is of high quality, having been developed by the Electronic Data Systems Corporation (EDS). The limitations of this software are as follows: (1) It is appropriate for preparation of only U.S. patent applications in fairly "low-tech" fields; (2) It provides only basic legal guidance; (3) Users must learn to use a proprietary word processor with limited features, and text prepared with other word processors must be imported into the proprietary word processor as RTF or ASCII text files; (4) The "built-in" patent application headings are not the headings recommended by the PTO. One inventor known to the applicants was required by a PTO Examiner to amend his specification to use the "correct headings."

Many inventors have been the recipients of documents generated by a Windows software tool available to PTO Examiners called "Action Writer." This software is a WordPerfect-for-Windows macro program that provides "canned" text for use in office actions. The focus of the program is on providing the rationale for rejecting patent claims and for responding to the patentability arguments of applicants.

Other information on the background of the invention is disclosed in a report entitled "Expert System for Recombinant DNA Invention Disclosure, Phase I Progress Report Volumes I and II," October, 1994, published by Yellowstone Environmental Science, Inc., 920 Technology Boulevard, Bozeman, Montana 59715. That disclosure is incorporated herein as if fully set forth.

SUMMARY OF THE INVENTION

The present invention is expert support system software that enables inventors to adequately disclose (communicate) the characteristics of their inventions to their technology manager and research sponsor, as well as to their patent professional (i.e., patent attorney or patent agent). The disclosure must allow the technology manager and/or research sponsor to decide whether to invest in protecting the invention. If protection is sought, it must also be complete enough for the patent professional to be able to determine whether patent protection is appropriate and, if so, to be used as a basis for preparation and prosecution of a patent application. Thus, three types of users are served by the proposed software product: inventors, technology managers, and patent professionals. Because the invention facilitates communication among parties with different vocabularies, perspectives, values, experiences and expertise, it can be classified as "domain-interaction" software. This type of software facilitates knowledge-sharing among "experts" from different domains. Such systems empower users by improving bi-directional communication of "mission-critical" domain knowledge. They eliminate the "say what?" bottlenecks which hamper productivity improvement.

Scientist/inventors interact with patent attorneys, for example, at a high level of sophistication in the preparation of patent applications that will eventually become patents with value as intellectual property. Scientist/inventors are experts in technological domain and patent attorneys are experts in the intellectual property domain. It is the responsibility of the patent attorney to teach the scientist/inventor how to disclose his/her invention, and to offer an opinion as to the patentability of the invention. It is the responsibility of the scientist/inventor to disclose the characteristics of his/her invention in the manner stipulated by the attorney, and to teach the attorney why the invention is useful, novel and unobvious.

Each expert participating in such an interaction provides information about his/her domain and receives information about the other expert's domain. Because domain knowledge can be complex and its language "foreign," exchanges of information are typically clarified by guidance, explanations, and examples. Guidance is provided in "layers" so its depth can be controlled by the person requesting it. The expert providing the information may want to know "why" it was requested, as well as "what" to provide, and "how" to provide it. Some explanatory knowledge is acquired by means of knowledge engineering methods, and is resident in the software in the form of "advisors" or "guides" accessible by means of forward chaining expert systems. Default explanatory information is customized by an expert for particular interactions or interaction types. Each expert also reports to the other on the status of his/her respective domain. Domain status data changes over time and is visualized for effective communication.

Domain-interaction software systems are categorized as hybrid systems. The components of such systems include a user interface (possibly different for each user group), knowledge base(s), an inference engine, database(s), a database manager, a document editor, a data visualization tool, and a communications capability. Expert system and/or decision support system and/or expert support system components are used to streamline information exchange.

The invention is executed on a programmed digital computer or processor. In the best mode the invention is executed on an IBM-compatible microcomputer (running the Microsoft Windows™ operating system) which includes a central processing unit, main storage, input/output resources, and a user interface including a manually-operated keyboard and mouse. An example of such a microcomputer is The Gateway 2000™ P5-60 Computer System. The architecture and operation of The Gateway 2000™ P5-60 Computer System are described in the *User's Guide* by Gateway 2000, 610 Gateway Drive, North Sioux City, S.Dak. 57049. In alternative embodiments, other types of microcomputers—such as the Apple Macintosh—and/or other operating systems—such as OS/2—are used.

The invention is a system that provides a framework for organizing information concerning the user's technology portfolio into technology groups. Each technology group is composed of a number of inventions. Each invention in a technology group may share one or more of the following features with other inventions in the group:

One person manages the inventions in the group

One or more of the inventors is the same

One or more of the prior art references is the same

One or more of the patent professionals is the same

The system allows the lists of common information (examples shown in Table 1) to be entered either as a set-up activity or during preparation of a disclosure. The system allows a user to

TABLE 1

Common Setup Information

| List | Information type |
|---|---|
| Inventions | Records[a] |
| Inventors | Records[a] |
| Patent professionals | Records[a] |
| Organizations | Records[a] |
| Prior art references | Records |
| Future actions | Records[b] |
| Depositories | Records[a] |

[a]Automatically alphabetically ordered
[b]Automatically ordered by date select an existing invention from or add a new invention to a technology group. When adding a new invention, the user is able to enter the general technology type of the invention (e.g., mechanical, electrical, software, chemical, or biotechnology).

The system allows the user to select a technology management activity that he/she wants to accomplish next. Examples of technology management activities include the following: record progress, search prior art, create/edit disclosure, evaluate invention, file patent application, prosecute patent application, market invention and prepare agreements. The system allows a user to select an existing disclosure from, or add a new disclosure to, an invention database. When adding a new disclosure the user is able to select a disclosure purpose. The user is also able to select an invention category, such as the following: (1) product, and (2) process.

After a disclosure is characterized and selected, the user is able to select one of the disclosure sections (examples shown in Table 2) on which to work. A forward-chaining expert system leads the user through authoring the sections by inputting invention characteristics. Each section includes information on a particular characteristic of the invention being disclosed. After a section has been modified and exited, the software indicates work on the section has occurred. The system provides reasons why each type of information is requested in a window at the bottom of each input screen. In the default settings mode, the "Why Is This Information Needed?" window appears each time an input screen appears.

The software system provides appropriate information on "how to" prepare the different sections of an invention disclosure in a "Legal Guide" window at the bottom of each input screen. In a preferred embodiment the user is able to access the following information which bears on content and format of the disclosure for at least the jurisdictions of the U.S. Patent and Trademark Office (PTO), Patent Cooperation Treaty (PCT), European Patent Office (EPO), and Japanese Patent Office (JPO): general overview, procedures, regulations, case law (e.g., court

TABLE 2

Disclosure Sections

| Section | Disclosure purpose | Information type |
|---|---|---|
| Inventors/applicants | All[a] | Ordered records |
| Title of the invention | All | Ordered list |
| Related patent applications | All | Record |
| Contracts and grants | SR[b] | Record |
| Resources used | SR | Record |

TABLE 2-continued

Disclosure Sections

| Section | Disclosure purpose | Information type |
|---|---|---|
| Important events | Each[a] | Record |
| Technical field | All | Text |
| Prior art U.S. patents | All | Ordered records |
| Prior art foreign patents | All | Ordered records |
| Prior art publications | All | Ordered records |
| Prior art problems | All | Text |
| Definitions of terms | All | Text |
| Nature of invention | All | Text |
| Essential elements | All | Record |
| Essential steps | All | Record |
| Purpose of invention | SR | Text |
| Utility of the invention | All | Text |
| Advantages of the invention | All | Text |
| Objects of the invention | PTO[d] | Text |
| Brief description of the drawings | All | Text |
| Material incorporated by reference | Each | Ordered records |
| Drawings | All | Graphics |
| Detailed description of the invention | All | Text |
| Deposit of biological material | All | Record |
| Sequence information | All | Record |
| Working example(s) | All | Text |
| Best mode(s) | PTO | Text |
| Alternative embodiments | All | Text |
| Industrial applicability | Some[e] | Text |
| Effects of the invention | JPO[f] | Text |
| Claims | All | Text |
| Abstract | All | Text |
| Patent professionals | All | Ordered records |

[a]Required for all disclosure purposes
[b]Required for sponsored research initial disclosures only
[c]Different version required for each disclosure type
[d]Required for U.S. patent application
[e]Required for PCT, EPO and JPO patent applications
[f]Required for JPO patent applications The software provides expert support systems that guide the user through a preliminary evaluation of the patentability and/or marketability of an invention for which a disclosure has been prepared. Features of the patentability expert support system include the following: knowledgebases (rules from PTO, PCT, EPO and JPO), why explanation screens, conclusion displayed, reasons for conclusion displayed, input first sought in disclosure database, input stored in disclosure database, warning displayed that choosing "unknown" will result in conclusion of unpatentability, revision of answers allowed, and user being allowed to complete evaluation even if invention is unpatentable.

The software arranges the invention disclosure sections and either displays them or outputs them (e.g., on a printer). The display or output is presented in the order and format appropriate for its selected purpose.

The software includes an online Windows Help system which provides overview information on invention disclosures and specific instructions pertaining to the user interface which is currently being used. Features of the online help system include: Help menu, contents topic, search dialogue box, browse sequence, back, history, bookmark, context-sensitive access, jumps, pop-up windows, secondary windows, user annotation, copy and paste from Help windows, print Help topics, and multiple Help windows open.

The present invention has a number of advantages over prior art systems. One object of the invention is to improve the quality of international, regional, and national patent applications for the purpose of reducing the duration of the pendency and associated uncertainty regarding the scope of their claims. Another object is to facilitate the authoring of disclosures for one or more purposes. These purposes include an initial disclosure to an employer and/or research sponsor; a non-enabling disclosure for use in marketing the invention in situations where confidential relationships cannot be established prior to disclosure; and patent applications to be filed with the U.S. Patent and Trademark Office, a Patent Cooperation Treaty international patent application receiving office, the European Patent Office, the Japanese Patent Office, or another regional or national patent office. Another object is to facilitate authoring of invention disclosures in "high-tech" fields such as biotechnology. Another object is to provide motivation and detailed legal guidance on content and format requirements to a user of the system. Another object is to facilitate authoring of the specification of patent applications to be input to the Electronic Applications System (EASY) under development by the European Patent Office (EPO), World Intellectual Property Organization (WIPO), U.S. Patent and Trademark Office (PTO), and to the Japanese paperless patent application filing system. Yet another object is to evaluate a disclosed invention for patentability and marketability. Yet another object is to reorganize disclosure information so that it is output in the format required by any one of a plurality of patent offices. Further objects and advantages of the invention will become apparent from consideration of the drawings and the ensuing description of it.

BRIEF DESCRIPTION OF THE DRAWINGS

The features of the invention will be better understood by reference to the accompanying drawings which illustrate presently preferred embodiments of the invention.

In the drawings:

FIG. 9 is a photograph of the main screen.

FIG. 10 is a photograph of the new invention screen.

FIG. 11 is a photograph of the new disclosure screen.

FIG. 12 is a photograph of the sections of the disclosure screen.

FIG. 13 is a photograph of a typical text input screen.

FIG. 14 is a photograph of a typical record input screen.

FIG. 15 is a photograph of a typical Help screen.

Figure 1:
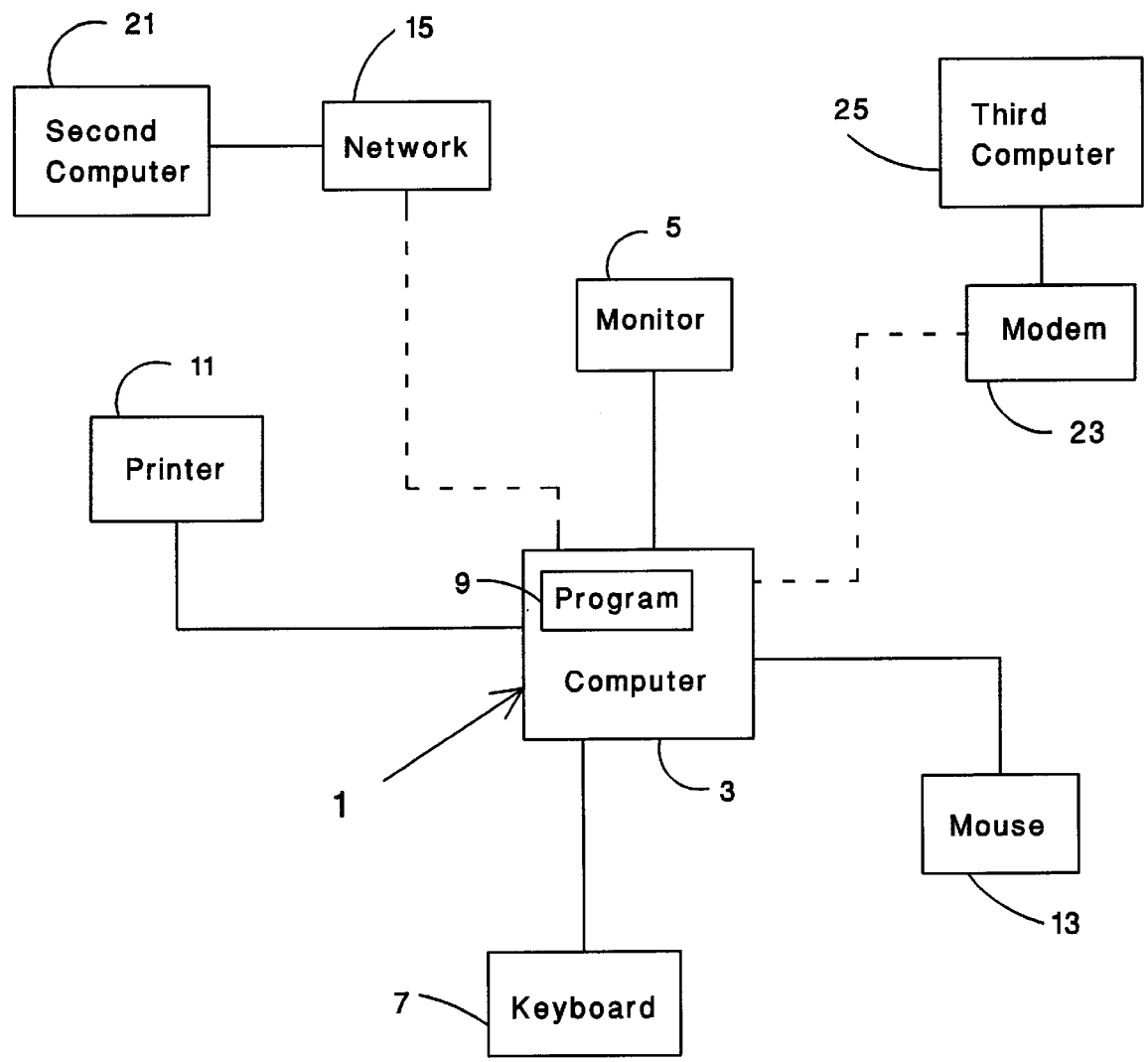
FIG. 1 is highly schematic block diagram of the expert support system.

The following reference numerals are used to indicate the parts of the invention on the drawings:

1 expert support system
3 computer
5 monitor
7 keyboard
9 software program
11 printer
13 mouse
15 network 21 second computer
23 modem
25 third computer
30 class DataRecords
31 abstract subclass RecordsDatabases
32 superclass Databases
33 abstract Subclass TextFilesDatabases
34 class TextRecords
37 PTOPatentabilityAssessments
39 concrete class PCTPatentabilityAssessments
41 concrete class EPOPatentabilityAssessments
43 concrete class JPOPatentabilityAssessments
51 abstract class PatentabilityAssessments
53 concrete class MarketabilityAssessments
55 superclass Experts
61 concrete class AnswerWindows
63 concrete class RecordEditWindows
65 concrete class OrderedRecordDisplayWindows
67 concrete class OrderedRecordEditWindows
69 concrete class TextDisplayWindows
71 abstract superclass Windows
81 concrete class EditLines
83 concrete class EditBoxes
85 concrete class ComboBoxes
87 abstract class EditObjects
89 concrete class ListBoxes
91 concrete class Menus
93 concrete class Buttons
95 concrete class CheckBoxes
97 concrete class RadioButtons
99 abstract class ScreenObjects
111 Text File Handling Subsystem
113 Windowing Subsystem
115 class TextEditWindows
117 class TextDisplayWindows
119 class TextEditors
121 class TextMovers
123 class TextFiles
131 Record Handling Subsystem
133 class RecordWindows
135 class EditObjects
137 class RecordDatabases
139 class OrderedRecordEditWindows
141 class OrderVerifiers
143 class OrderedRecordDisplayWindows
151 Expert Support Subsystem
153 class AnswerWindows
155 class RadioButtons
157 class InferenceEngines
159 class RecordDatabases
161 class Knowledgebases

DESCRIPTION OF THE PREFERRED EMBODIMENTS

Reference is now made to FIG. 1 which is a highly schematic block diagram of a representative embodiment of expert support system 1. System 1 comprises computer 3, output device or monitor 5, input device or keyboard 7, and software program or programs 9 which preferably reside(s) in computer 3. System 1 may also comprise printer 11 and mouse 13. In an alternative embodiment, System 1 may comprise network 15 and all or part of program or programs 9 comprising sets of instructions that may reside and/or be executed in second computer 21. In yet another embodiment, system 1 comprises modem 23 which connects computer 3 with third computer 25 in which all or part of program or programs 9 may reside and/or be executed.

Invention disclosures serve a variety of purposes. Most basically, invention disclosures allow for management of (hopefully valuable) intellectual property by giving it an identity. Thus, an initial purpose of an invention disclosure is to establish the date of conception of an invention. This is important because currently U.S. patents are granted to the "first to invent." While other patent-granting organizations grant patents on a "first to file" basis, they still require that no one else can have disclosed the invention publicly. Thus, a public invention disclosure can preclude patentability in certain situations.

A second purpose of invention disclosures is to facilitate evaluation of the market value of the invention by technology managers. Such an evaluation is necessary because preparation, filing, and prosecution of patent applications can be time-consuming and expensive. Care must be taken to ensure that the commercial potential of the invention is commensurate with such efforts.

An invention disclosure can also serve the purpose of compliance with the terms of an employment agreement or with the terms of a contract or grant award. For example, in accordance with the *Bayh-Dole Act* (*Public Law* 98–620, which amended *Public Law* 96–517), inventions "first conceived or actually reduced to practice" during the performance of federally-funded research must be disclosed to the research sponsor under regulations contained in 37 CFR 401, *Rights to Inventions Made by Nonprofit Organizations and Small Business Firms*. Most employment contracts also require disclosure of inventions produced by employees during working hours or inventions made using facilities of the employee.

A "non-enabling" invention disclosure serves a fourth purpose. This type of disclosure is used by technology managers to attract commercial interest in an invention in a period during which secrecy is still required (i.e., prior to the filing of a patent application).

A fifth purpose of invention disclosures is to facilitate preparation of a patent application by a patent professional (patent attorney or agent). In exchange for the granting of a patent, patent laws require disclosure of a description of an invention and an explanation of its operation.

To a large degree, content requirements for an invention disclosure depend on the purpose for which it is prepared. Content requirements for a number of types of invention disclosures are summarized below. This section comprises a knowledgebase concerning invention disclosure requirements.

An invention disclosure required by a contract, termed herein an initial invention disclosure, must comply with the terms of that contract. Generally, the following information is required:

TITLE OF INVENTION

Inventor(s) including name, social security number, position, department, citizenship, work address, work voice telephone number, work fax telephone number, work e-mail address, home address and home voice telephone number Contract or grant project(s) during which the invention was conceived or first reduced to practice including identifying number, sponsor and principal investigator Dates and details of and witnesses to important events including initial idea, first oral or written description of the complete invention (conception), first successful demonstration (actual reduction to practice), publications containing a full description of the invention and oral disclosures of the invention

DESCRIPTION OF THE INVENTION

General purpose of the invention
Practical applications

Technical description of the invention
Essential elements (steps) of the invention
Interrelationships of elements (steps)
Mode of operation
Possible variations and modifications
Advantages and improvements over existing methods, devices, or materials
Features believed to be new
State and limitations of the (prior) art
Patents
Publications
Other prior art
Potential licensees including organization, reason for interest, contact name, address and voice telephone number A non-enabling invention disclosure is designed to motivate the reader to want to learn more about the invention. Because the secrecy of the invention must be maintained, the disclosure should provide less information than the amount that a person skilled in the art would need to practice the invention. Generally, the following information is appropriate:

Invention title
Purpose of the invention
Prior art solutions
Problems with prior art
Advantages of the invention Content requirements of patent application invention disclosures are established by law and stipulated in regulations. All patent-granting organizations have established format requirements for invention disclosures as noted below.

General disclosure requirements of the U.S. Patent and Trademark Office (PTO) are stipulated in Subpart B of Title 37 of the Code of Federal Regulations, and specific requirements for biotechnology disclosures are given in Subpart G (PTO, 1992). Seventy-three pages of detailed procedural guidelines concerning the parts, form, and content of a U.S. patent application are given in Chapter 600 of the *Manual of patent Examining Procedure* (MPEP) (PTO, 1992). Guidelines for patentability determinations are given in Chapter 2100 of the MPEP. Guidelines for drafting a model patent application presented in the MPEP suggest the following headings (MPEP 608):

Title of the Invention
Cross-References to Related Applications (if any)
Statements as to rights to inventions made under Federally-sponsored research and development (if any)
Background of the Invention
Field of the Invention
Description of related art including information disclosed under sections 1.97 and 1.98
Summary of the Invention
Brief Description of the Drawing
Description of the Preferred Embodiment(s)
Claim(s)
Abstract of the Disclosure Patent Cooperation Treaty (PCT) invention disclosure requirements are documented in the following publications: *Handbook on Industrial Property Information and Documentation* (World Intellectual Property Organization, WIPO, 1991); *Patent Cooperation Treaty (PCT) and Regulations under the PCT* (WIPO, 1992) and *PCT Applicant's Guide* (WIPO, 1994) The *PCT Applicant's Guide* stipulates that the description of an invention should have the following headings:

Technical Field
Background Art
Disclosure of Invention
Brief Description of Drawings
Best Mode for Carrying Out the Invention
or
Mode(s) for Carrying Out the Invention
Industrial Applicability It also provides specific format requirements for disclosures of nucleotide and amino acid sequences. The *PCT Applicant's Guide* further notes that "the details required for the disclosure of the invention . . . depend on the practice of the National Offices."

The disclosure requirements of the European Patent Office (EPO) are documented in the following publications: *National Law Relating to the EPC* (EPO, 1991); *European Patent Convention* (EPO, 1991); *How to Get a European Patent: A Guide for Applicants* (EPO, 1992) and *Guidelines for Examination in the European Patent Office* (EPO, 1992). The *Guide for Applicants* stipulates that the description of the invention should have the following sections:

Technical Field
Background Art
Disclosure of the Invention
Brief Description of the Figures
Detailed Account of at Least One Way of Carrying Out the Invention
Statement of How the Invention is Capable of Industrial Application Provisions regulating representation of nucleotide and amino acid sequences in patent applications became mandatory on Jan. 1, 1993 (EPO, 1992). A computer program, PatentIn, is available to assist applicants in meeting the physical requirements of U.S. and EPO sequence listing rules.

The disclosure requirements of the Japanese Patent Office (JPO) are documented in the following publications: *Guide to Industrial Property in Japan* (JPO, 1988); *Guideline for Accelerated Examination and Accelerated Appeal; Examination System for Working-Related Patent (or Utility Model) Applications* (JPO, 1989); *Patent Application Paperless System Guide Book* (JPO, 1990); *Industrial Property Rights in Japan* (JETRO, *1991*); *Japanese Laws Relating to Industrial Property* (AIPPI Japan, *1992*); *Examination Manual for Patent and Utility Model* (AIPPI Japan, 1992) and *Supplemental Guidelines for Examination Practice under Revised System of Multiple Claims* (AIPPI Japan, 1992). The *Guide to Industrial Property in Japan* stipulates that specification of a Japanese patent application should have the following headings:

Title of the Invention
Claim(s)
Detailed Explanation of the Invention
Industrial Field of Application
Prior Art
Problems that the Invention is to Solve
Means of Solving the Problems
Operation of the Invention
Working Examples Effects of the Inventions Brief Explanation of the Drawings (if any)

In any rapidly developing art such as biotechnology, criteria for determining patentability and the adequacy of disclosure are in constant flux. Decisions of the U.S. Board of Patent Appeals and Interferences and the U.S. courts, as well as decisions of the EPO Technical Boards of Appeal, regularly establish new criteria and refine existing criteria. These decisions are published in such journals as the *US. Patent Quarterly* and the *Official Journal of the EPO* and are analyzed in a variety of legal journals. Proposed legislation, such as the Biotechnology Patent Protection Act (1991), may indicate trends in disclosure requirements and suggest potential disclosure strategies.

U.S. Patent and Trademark Office requirements reflect the fact that a U.S. patent may be obtained by its inventor(s) for a useful, new, and unobvious invention. The invention must fall into one of the following five classes of inventions:

1. a process (which may be a process of making something or a process of using something)
2. a machine
3. a manufacture (article)
4. a composition of matter, and
5. an improvement of any of the above.

A complete U.S. patent application comprises the following elements (37 CFR 1.51):

A specification, including a claim or claims

An oath or declaration

Drawings, when necessary

The prescribed filing fee

The content and format of the oath or declaration and filing fee calculations are standardized and have been automated by electronic patent application filing aids such as EASY or Patent It Yourself (EDS, 1994). For that reason, they are not covered here.

The material presented below was incorporated into the Legal Guide section of the software. The material was quoted or derived from U.S. Government publications, such as the *Patent Academy Instructors Manual* (PTO, 1989). Salient portions of the *Manual of Patent Examining Procedure* (MPEP), the *Code of Federal Regulations* (CFR), and administrative and judicial decisions concerning the sections of a U.S. patent application are presented in Appendix A, B and C of Exhibit B, respectively. At least one example of each section is presented in Appendix D of Exhibit B.

Inventors. Care must be taken in identifying the inventor or inventors, as only the inventor or inventors may sign the oath or declaration and obtain a U.S. patent. Each person who actually conceived claimed subject matter must be listed as one of the inventors. The degree of contribution to claimed subject matter is irrelevant, but it must constitute real invention, and not merely "a pair of hands." The inventors need not have physically worked together, or at the same time, or made the same type or amount of contribution, or each have contributed to all claimed subject matter.

When two or more parties claim the same invention in separate U.S. patent applications, the patent will be awarded to the party who can prove that he/she/they were the "first to invent." The first party to apply for a patent on the invention (i.e, the party who first "constructively" reduced the invention to practice, or "senior party") is presumed to be the "first to invent." This presumption can be overcome by a "junior party" who can prove actual reduction to practice before the senior party, unless the senior party can prove that he was first to conceive of the invention and that he was reasonably diligent in developing the invention during the period between his conception of the invention and his reduction of the invention to practice. Thus, the general rule is that the law "regards the first conceiver, if he used reasonable diligence in perfecting his invention and reducing it to practice, as the first inventor, not withstanding the invention was first reduced to practice by another" (In re Harper, 1930). Uncorroborated and undocumented testimony of an applicant as to a critical date is insufficient proof that an action occurred.

The date upon which an invention can be proven to have been completed also affects which references (patents, publications, etc.) can be used as "prior art" during the examination of a patent application. In general, only those references that were published prior to the date of invention can be used as prior art. The "general working consensus" is that the actual date on which the journal issues (to subscribers or other members of the public) is the effective date (of "publication") for purposes of patent law.

Title of the Invention. The title of the invention should be technically accurate and descriptive, but brief. Preferably, the title should consist of two to seven words (less than 250 characters). It should be placed at the top of the first page of the specification.

In that the first step in bibliographic (key word) and classification (class and subclass) patent searches is viewing a listing of the first 69 characters of patent titles, care should be taken in choosing each word of an invention title. A reading of the first 69 characters of the title should be sufficient to motivate the reader to view the entire title and patent abstract.

Cross-References to Related Applications. A U.S. patent application is entitled to the filing date of an earlier "related" application under certain conditions. The subsequent application (which is called a continuing application) must be for an invention disclosed in the earlier application, must be filed before the earlier application is issued as a patent, is abandoned, or rejected by the courts, must be filed by at least one inventor named in the earlier application, and must contain a reference to the earlier application at the time of filing. Thus, a patent application is entitled to the benefit of the filing date of one or more prior, copending applications which have at least one common inventor if the invention claimed in the subsequent (continuing) application is disclosed in the prior application and the prior application is referenced in the continuing application. An appropriate reference to a related application will be generated by this software as follows:

"This is a (division, continuation, or continuation-in-part) of application Serial No.() filed (date).

Statement as to Rights to Inventions. Most contracts and grants awarded by the U.S. Government require reporting of inventions created or first actually reduced to practice during the contract or grant period. The Government typically has rights in such inventions. When a contractor or grantee retains the patent rights to an invention that was conceived or first reduced to practice under a U.S. Government contract or grant, the patent application must include a statement of Government rights in the invention. In most situations, an appropriate statement for disclosing Government rights will be generated by this software as follows:

"The U.S. Government has a paid-up license in this invention and the rights in limited circumstances to require the patent owner to license others on reasonable terms as provided for by the terms of (Contract No. or Grant No.) awarded by (Agency)."

Background of the Invention. The background of the invention is set forth in two parts: (1) the field of the invention, and (2) a description of related art. The field of the invention is a statement of the field of art to which the claimed invention pertains. If a patent search has identified the classification (class and subclass) of the invention, then the subclass definition may be paraphrased. This section may also be titled "Technical Field."

The description of related art section presents a sunmary of the prior art in the field of the invention. Reference should be made to specific documents, if appropriate. Problems left unsolved by the prior art that are solved by the present invention should be discussed. This is the first place in the disclosure that evidence that the invention meets the three criteria for patentability (utility, novelty, and unobviousness) can be presented. This is accomplished by pointing out the limitations of the prior art, thus setting the stage for a delineation of the advantages of the present invention in the Summary section.

Summary of the Invention. A brief summary of the inventive concept(s) is presented in this section. The nature and gist of the inventive concept(s) should be set forth in broad statements. These statements may paraphrase and amplify the broadest claims. The summary should point out the advantages of the invention and how it solves problems existing in the art (that were described in the Description of Related Art section). The utility of the invention should be pointed out. The section may end with statements of the "objects" of the invention.

It is in this section that the applicants provides a summary of the information upon which a determination of the utility, novelty, and unobviousness of the invention can be based. If a reading of this section does not convince a patent examiner that the invention meets the criteria of patentability, then that difficult task will have to be accomplished during prosecution of the application. For this reason, it is prudent to state the specific, credible uses of the invention to establish its utility. It is also effective to provide a listing of the elements (or steps) of the embodiment (version) of the invention described in the broadest (least limited) claim. The use or uses must be credible to a person skilled in the art of the invention. Examples should be provided of means for accomplishing functions recited in the broadest claims. Unexpected or surprising results that bear on a determination of unobviousness should be summarized.

Brief Description of the Drawing(s). Most disclosures contain drawings that illustrate the elements and/or steps of the invention. This section of an invention disclosure contains an initial reference to each drawing by number and a brief description of the nature (e.g., plan, elevation, schematic block diagram, etc.) of each drawing.

Description of the Preferred Embodiment(s). This is the heart of the disclosure. Here, a written description of the invention and a description of the process of making and using the invention are presented. At least one, and preferably several, preferred embodiments (also called best modes) of the invention are described in great detail.

U.S. law requires that the disclosure be sufficient to teach the invention to a "person skilled in the art". It is also the case that "new matter" (additional disclosure of the inventive concept) cannot be added to a patent application after it is filed. For these reasons, it is better to err on the side of too much disclosure rather than on the side of too little.

In the typical case of a biotechnology invention involving molecular biology or genetic engineering, the following descriptive material may be appropriate for inclusion an invention disclosure, if applicable:

Identification of any DNA sources, including accession numbers and addresses of depositories Procedure used to isolate and purify any gene(s)

Procedure used to synthesize and label any probe(s)

Procedure used to prepare any genomic or cDNA libraries

Procedure used to enrich any DNA of interest

Procedure and conditions of hybridization

Procedure used for cloning

Procedure used for characterizing clones

Procedure used to construct vector(s)

Identification and sources of preferred and alternative cloning vectors, promoters, terminators, etc.

Preferred and other host cells for transformation, including accession numbers and addresses of depositories Preferred culture conditions Procedures for purification of protein(s)

Procedures for incorporating the protein into useful product(s)

Nature and source of all trademarked material used in making the invention.

References in U.S. patent applications as filed to deposits of biological materials should include the following:

Deposit (or accession) number

Date of the deposit

Name and address of depository

Taxonomic description to the extent available

While any word-processing program which has the capability to convert a file into ASCII text can be used to generate a Sequence Listing, it is recommended that the PatentIn computer program be used. In any event, extreme care must be taken in following sequence listing format rules given in the *Manual of Patent Examining Procedure* (MPEP) and in PatentIn documentation.

In the typical case of a biotechnology invention involving molecular biology or genetic engineering, the following sequence information may be appropriate for inclusion an invention disclosure, if applicable:

Sequence of any probe(s)

Sequence of any known protein(s)

Preferred regulatory sequence(s)

U.S. patent law requires that at least the "best mode" of the invention be disclosed. It is prudent, however, to include in the specification at least a mention of all conceivable alternatives to the mode that is considered the best mode at the time of filing of the patent application. This will make it more difficult for other inventors to obtain patents on improvements to the present invention and could facilitate obtaining broader claims.

Claims. U.S. patent applications must contain at least one claim. A patent application that is filed without at least one claim is not entitled to a filing date (MPEP 608.01). A claim is a legal description of the "metes and bounds" of an embodiment of an invention. As such, claims contain terms and phrases that have come to have meanings particular to patent law.

Abstract of the Disclosure. The abstract is a summary of the disclosure as a whole in a single paragraph of 250 words or less. In that the most widely-available patent searching software is capable of searching for patent titles and abstracts by key words and phrases, care should be taken to ensure that appropriate key words and phrases occur in patent abstracts. It should fulfill the purpose of permitting the PTO and the public to rapidly determine the nature and gist of the technical disclosure from a cursory inspection.

Drawings. In the typical case of a biotechnology invention involving molecular biology or genetic engineering, the following types of drawings may be appropriate for invention disclosure:

Schematic block diagram of the process of making the invention with each block being a step in the process, e.g., the procedure for isolating and purifying or synthesizing a gene, for synthesizing and labeling an oligonucleotide probe, for preparing a genomic or cDNA library (or for enriching the DNA of interest), or for constructing a hybrid plasmid.

Restriction endonuclease cleavage map of a novel vector

Obtaining patent protection under the Patent Cooperation Treaty (PCT) is accomplished in two phases. It begins with the filing of an international patent application and ends (hopefully) with the grant of a number of national and/or regional patents: hence the terms, "international phase" and "national phase." It is the international phase patent application that is the subject of this disclosure.

The description of an invention in a PCT application must disclose the invention in a manner sufficiently clear and complete for it to be carried out by a person skilled in the art. The sections of a PCT patent application are described below (WIPO, 1994):

Title of Invention. The title of the invention must be short (preferably two to seven words, when in English or translated to English) and precise.

Applicant(s). The applicant(s) for a PCT international patent need not be the "first inventor(s)" as is the case in the U.S. At least one of the applicants must be a resident or national of a PCT Contracting State. The applicant(s) must be the first inventor(s), however, if a U.S. patent will be sought in the national phase.

Technical Field. This section specifies the technical field to which the invention relates.

Background Art. This section indicates the background art which the applicant, regards as useful for the understanding, searching, and examination of the invention. Preferably, it should cite the documents that contain the prior art.

Disclosure of Invention. In this section, the invention as claimed, is disclosed in such terms that the technical problem that it solves (even if not expressly stated as such) and its solution can be understood. The advantageous effects of the invention, if any, with reference to the background art are stated.

Brief Description of the Drawings. The figures in the drawings, if any, are briefly described in this section.

Mode(s) or Best Mode for Carrying Out the Invention. If at least one of the designated states requires the indication of the "best mode" (for instance, the PTO), that best mode must be indicated in the description. This is done in terms of examples, where appropriate, and with reference to the drawings, if any.

Industrial Applicability. When it is not obvious from the description or nature of the invention, the way in which the invention is capable of exploitation in industry is explicitly stated in this section. The way in which it can be made and used, or, if it can only be used, the way in which it can be used is described. The term "industry" is to be understood in its broadest sense as in the Paris Convention for the Protection of Industrial Property.

The European Patent Office establishes requirements for obtaining a European patent. A European patent confers on its owner, in each contracting state for which it is granted, the rights that would be conferred by a national patent granted by the State. European patents are granted for inventions with industrial applicability which are new and which involve an inventive step. The sections of the disclosure portion of an EPO patent application are described below (EPO, 1992):

Technical Field. This section indicated the technical field to which the invention relates. This can be indicated by repeating fully, or in substance, the initial (prior art) portion of an independent claim, or by referring to it.

Background Art. An account of the background art that would be useful for understanding the invention is presented. Documents describing prior art should be cited wherever possible. The citations should be sufficiently complete to allow them to be consulted: i.e., in the case of patent specifications, giving the country and number; in the case of books, the author, title, publisher, edition, place and year of publication, plus the page numbers; and in the case of periodicals, the title, year, issue and page numbers.

Disclosure of the Invention. The disclosure of the invention must be such that the technical problem (even if not expressly stated as such) and its solution can be understood. To facilitate understanding the solution as given in the independent claim or claims, the characterizing portion of the independent claim or claims may be repeated or referred to or the features of the solution can be set out in a form which corresponds in substance to the claim(s). Details of the embodiments of the invention as given in the dependent claims are elucidated only if this is not done in the description of the way or ways of carrying out the invention as claimed, or in the figures in the drawings. Any advantageous effects of the invention vis-à-vis the background art are stated. Care must be taken, however, not to disparage a particular earlier product or process.

Brief Description of the Figures. A brief description of the figures in any drawings is presented, indicating the numbers of the figures.

Detailed Account of at Least One Way of Carrying Out the Invention. A detailed description of at least one embodiment of the invention is presented. This is usually done by means of examples that are explained by reference to the drawings using the reference manuals.

Statement of How the Invention is Capable of Industrial Application. Because a criterion of patentability is that the invention be capable of industrial application, a statement to that effect is included in the application.

The *Guide for Applicants* (EPO, 1992) further provides:

"In exceptional cases the description may be set out in a different manner and sequence to that described above if this would afford a better understanding and a more economic presentation."

"Although the description should be clear and straightforward with avoidance of unnecessary technical jargon, the use of recognized terms of art is acceptable, and will often be desirable. Little known technical terms may be allowed provided that they are adequately defined and that there is no generally recognized equivalent."

"Proper names or similar words may not be used to refer to articles unless they would thereby be identified unambiguously. Even if such a word is used the product must be sufficiently identified, without reliance upon the word, to enable the invention to be carried out by the skilled person. If such proper names or similar words are registered trade marks, that fact must be mentioned."

The Japanese Patent Office establishes requirements for obtaining a Japanese patent. A Japanese patent may be obtained by the first to file a patent application that describes a useful and novel invention that involved "an inventive step." The description of the sections presented below was derived from the *Guide to Industrial Property in Japan* (JPO, 1988):

Industrial Field of Application. This is a statement of the technical field to which the invention pertains. It is particularly important in those situation in which the industrial applicability of the invention is not clear.

Prior Art. The content of the prior art(s) to which the invention is to be compared is described. As a rule, documents that describe prior art are cited in the application. If the invention is totally novel and no prior art exist, a statement to that effect is included.

Problems That the Invention Is to Solve. The application contains an analysis of the problems involved with (or limitation of) the prior art that are solved by the invention. Disparaging the prior art is not allowed.

Means of Solving the Problems. The means (e.g., constituents or elements) of the invention that overcome the problems of the prior art are described. The description explains how the elements are related to one another.

Operation of the Invention. The specification describes how the elements of the invention function. How the elements, in combination, operate to solve the problems of the prior art is described.

Working Examples. The invention must be described in such concrete terms as to enable its reproduction. As many different embodiments of the invention as possible should be described. If claims are written to recite invention elements generically (e.g., means claims), the specification is required to give representative examples of what is meant, except in cases in which the meaning of such claims can be grasped theoretically or from experience.

Effects of the Invention. The effects produced by the indispensable constituent features (i.e., required elements) of the invention are described. Comparative data on the results of the invention compared to the results of the prior art are presented.

In a preferred embodiment, software program 9 is developed by means of an object-oriented design process and is implemented in an object-oriented computer language, such as C++. Object-oriented design is the process by which software requirements are turned into a detailed specification of objects (Wirfs-Brock, R., et al. *Designing Object-Oriented Software*. New Jersey: PTR Prentice-Hall, 1990). The object-oriented design process is typically iterative.

Following procedures recommended by Wirfs-Brock (1990) and Booch (Booch, G. *Object-Oriented Design with Applications*. U.S.A.: Benjamin/Cummings Publishing Company, Inc., 1991), an initial exploratory phase of object-oriented software design is conducted. Key abstractions that occur in the problem domain are identified. In this way, the requirements specification is decomposed into a variety of objects which communicate with one another to achieve the overall goal of the software. Objects are instances of classes and comprise sets of instructions for the operation of computer 3. One way this is accomplished is by reviewing an outline requirements specification to extract noun phrases from which to build a list of candidate classes of objects. Candidates for abstract superclasses are identified by grouping classes that share common attributes. A short statement of the purpose of each class is prepared.

The responsibilities of the software are extracted from the specification noting actions and information. These responsibilities are then assigned to specific classes. Collaborations between classes are identified by examining the responsibilities associated with each class. A collaboration is the embodiment of a contract between a client class and a server class. A client class sends a message to a server class requesting assistance in fulfilling a client responsibility. The output of this design phase is class tables (Wirfs-Brock, 1990).

Exploration of the problem domain begins with identification of the key classes of objects by capturing the user's vocabulary in nouns (classes) and verbs (methods). The key classes of objects included in the invention are:

Database objects

Expert objects

User interface objects

Exploratory design of the software identifies classes of persistent database objects the application must manage. The attributes of each class of database objects are quantified. Specifically, for each data object (instance of a class), the description, type and length of database field that will hold the object is presented. Key components of domain-interaction systems are database objects. The purpose of these objects is to maintain data in a form that is changeable, but that persists from one use of the software to another.

A list of classes of database objects is presented in alphabetical order in Tables 3 and 4. Database classes responsible for managing databases comprised of multiple element records are described in Table 5. Database classes responsible for managing databases comprised of text file names are described in Table 4. Also listed are the data members (field names) and types of data elements that comprise each database.

Each database class is responsible for management of its data elements. As this database management behavior is shared by all database management classes, an abstract superclass (Database) is created to capture this shared behavior in one place. Those shared behaviors (member functions) are described in alphabetical order in Table 5.

Expert (or knowledge-based) objects are also key components of domain-interaction systems. These objects comprise

TABLE 3

Classes of Record Database Objects

| Class | Data member | Type[a] |
|---|---|---|
| ActualReductionsTo-Practice | disclosureID | C/20 |
| | actualReductionToPracticeDate | C/8 |
| | actualReductionToPracticeLocation | C/40 |
| | witnessed[d] | C/3 |
| Awards | disclosureID | C/20 |
| | awardTitle | C/200 |
| | awardNumber | C/50 |
| | awardingAgency | C/100 |
| | lastNameOfPI | C/30 |
| | firstNameMIOfPI | C/30 |
| | awardType C/1 | |
| BiologicalMaterials | disclosureID | C/20 |
| | accessionNumber | C/20 |
| | depositDate | D/8 |
| | depositoryID | C/8 |
| Claims | disclosureID | C/20 |
| | claimNumber | N/3 |
| | claimType[c] | C/1 |
| Conceptions | disclosureID | C/20 |
| | conceptionDate | C/8 |
| | conceptionLocation | C/40 |
| | witnessed[d] | C/3 |
| Definitions | disclosureID | C/20 |
| | termDefined | C/40 |
| | termDefinition | C/250 |
| Depositories | depositoryID[e] | C/8 |
| | depositoryName | C/50 |
| | depositoryAddress | C/50 |
| DependentClaims | disclosureID | C/20 |
| | claimNumber | N/3 |
| | dateAmended | D/8 |
| | timesAmended | N/2 |
| | wordProcessorFileName | C/8 |
| Deposits | disclosureID | C/20 |
| | depositID | C/30 |

TABLE 3-continued

Classes of Record Database Objects

| Class | Data member | Type[a] |
|---|---|---|
| | depositDescription | C/20 |
| | deposited[d] | C/3 |
| DiligenceActions | disclosureID | C/20 |
| | diligenceActivity | C/100 |
| | dilegenceActivityDate | C/8 |
| Disclosure | disclosureID | C/20 |
| | disclosureShortName | C/30 |
| DisclosureToAnother | disclosureID | C/8 |
| | disclosureDate | C/8 |
| | disclosureLocation | C/40 |
| | witnessed[d] | C/3 |
| ForeignReferences | priorArtForeignID | C/8 |
| | country | C/20 |
| | documentNumber | C/20 |
| | publicationDate | D/8 |
| FutureActions | disclosureID | C/20 |
| | futureAction | C/20 |
| | dueDate | D/8 |
| | patentApplicationSerialNumber | C/10 |
| | firstInventorsLastName | C/15 |
| ImportantEvents | disclosureID | C/20 |
| | firstConceptionDate | C/8 |
| | firstConceptionLocation | C/40 |
| | firstSketchDate | C/8 |
| | firstSketchLocation | C/40 |
| | firstWrittenDescriptionDate | C/8 |
| | firstWrittenDescriptionLocation | C/40 |
| | firstDisclosureToAnotherDate | C/8 |
| | firstDisclosureToAnotherLocation | C/40 |
| | firstDiligenceActivityDate | C/8 |
| | firstDiligenceActivityLocation | C/40 |
| | firstActualReductionToPracticeDate | C/8 |
| | firstActualReductionToPracticeLocation | C/40 |
| | firstNonConfidentialDisclosureDate | C/8 |
| | firstNonConfidentialDisclosureLocation | C/40 |
| | firstPublicationDate | C/8 |
| | firstPublicationLocation | C/40 |
| IndependentClaims | disclosureID | C/20 |
| | claimNumber | N/3 |
| | timesAmended | N/2 |
| | dateAmended | D/8 |
| | claimText | C/250 |
| Inventions | inventionID | C/20 |
| | inventionShortName | C/40 |
| InventorOrder | disclosureID | C/20 |
| | inventorID | C/11 |
| | inventorOrder | C/2 |
| Inventors | inventorID | C/11 |
| | inventorLastName | C/30 |
| | inventorFirstNameMI | C/30 |
| | inventorPosition | C/20 |
| | inventorDepartment | C/20 |
| | inventorWorkTelephoneNumber | C/13 |
| | inventorFaxTelephoneNumber | C/13 |
| | inventorEMailAddress | C/20 |
| | inventorWorkAddress | C/30 |
| | inventorHomeAddress | C/30 |
| | inventorHomeTelephoneNumber | C/13 |
| | inventorCitizenship | C/20 |
| NonConfidentialDisclosures | disclosureID | C/20 |
| | disclosureDate | C/8 |
| | disclosureLocation | C/3 |
| | witnessed[d] | C/40 |
| Organizations | organization | C/30 |
| | school | C/30 |
| | department | C/30 |
| | institute | C/30 |
| PatentProfessionals | patentProfessionalID | C/8 |
| | patentProfessionalFirmName | C/100 |
| | patentProfessionalLastName | C/30 |
| | patentProfessionalFirstNameMI | C/4 |
| | patentProfessionalTelephoneNumber | C/50 |
| | patentProfessionalFaxNumber | C/13 |
| | patentProfessionalEMailAddress | C/13 |
| | patentProfessionalAddress | C/13 |
| PriorArtForeignOrders | disclosureID | C/20 |
| | priorArtForeignID | C/8 |
| | priorArtForeignOrder | C/2 |
| PriorArtPublicationOrders | disclosureID | C/20 |
| | priorArtPublicationID | C/8 |
| | priorArtPublicationOrder | C/2 |
| PriorArtUSOrders | disclosureID | C/20 |
| | priorArtUSID | C/8 |
| | priorArtUSOrder | C/2 |
| PublicationReferences | priorArtPublicationID | C/8 |
| | authorLastName | C/20 |
| | authorInitials | C/6 |
| | PublicationTitle | C/30 |
| | relevantPages | C/20 |
| | PublicationMonth | C/2 |
| | PublicationYear | C/2 |
| | PublicationName | C/20 |
| Publications | disclosureID | C/20 |
| | PublicationDate | C/8 |
| | PublicationLocation | C/40 |
| | witnessed[d] | C/3 |
| RelatedPatentApplications | disclosureID | C/20 |
| | serialNumber | C/20 |
| | title | C/250 |
| | filingDate | D/8 |
| | abandoned[d] | C/1 |
| | patentNumber | C/10 |
| Sketches | disclosureID | C/20 |
| | sketchDate | C/8 |
| | sketchLocation | C/3 |
| | witnessed[d] | C/40 |
| Titles | disclosureID | C/20 |
| | titleRank | N/1 |
| | inventionTitle | C/250 |
| USPatentReferences | priorArtUSID | C/8 |
| | patenteeLastName | C/20 |
| | patenteeInitials | C/20 |
| | patentNumber | C/20 |
| | patentIssueDate | D/8 |
| Witnesses | disclosureID | C/20 |
| | witnessedEventType[f] | C/8 |
| | witnessName | C/40 |
| | witnessAddress | C/120 |
| | witnessTelephoneNumber | C/40 |
| Class | Data member | Type[a] |
| WrittenDescriptions | disclosureID | C/20 |
| | descriptionData | C/8 |
| | descriptionLocation | C/40 |
| | witnessed[d] | C/3 |

[a]Data member (field) types are as follows: C - character, N - numeric, D - date, L - logical, and M - memo.
[b]Award type pick list is contract and grant.
[c]Claim type pick list is dependent and independent.
[d]Pick list is yes and no.
[e]Depository ID pick list is NRRL, VKPM, VNIIA, ATCC, AGAL, BCCM, CBS, CECT, CNCM, CCAP, DML, CCM, CCY, DSM, ECACC, IBFM-VKM, IMI, KCTC, KCCM, NBIMCC, NCAIM, NCFB, NCTC, NCYC, NCIMB, NIBHT, and OTHER.
[f]Witnessed event type pick list is Conception, Sketch, Written Description, Disclosure to Another, Diligence, Actual Reduction to Practice, Nonconfidential Disclosure, and Publication.

TABLE 4

Classes of Text Database Objects

| Class | Data member | Type[a] |
|---|---|---|
| Advantages | disclosureID | C/20 |
| | wordProcessorFileName | C/8 |
| Alternative- | disclosureID | C/20 |

TABLE 4-continued

Classes of Text Database Objects

| Class | Data member | Type[a] |
|---|---|---|
| Embodiments | wordProcessorFileName | C/8 |
| BestModes | disclosureID | C/20 |
|  | wordProcessorFileName | C/8 |
| Effects | disclosureID | C/20 |
|  | wordProcessorFileName | C/8 |
| Industrial- | disclosureID | C/20 |
| Applications | wordProcessorFileName | C/8 |
| Natures | disclosureID | C/20 |
|  | wordProcessorFileName | C/8 |
| Objects | disclosureID | C/20 |
|  | wordProcessorFileName | C/8 |
| PriorArtProblems | disclosureID | C/20 |
|  | wordProcessorFileName | C/8 |
| ResourcesUsed | disclosureID | C/20 |
|  | source | C/40 |
|  | wordProcessorFileName | C/8 |
| TechnicalFields | disclosureID | C/20 |
|  | wordProcessorFileName | C/8 |
| WorkingExamples | disclosureID | C/20 |
|  | wordProcessorFileName | C/8 |

[a]Data member (field) types are as follows: C - character, N - numeric, D - date, L - logical, and M - memo.

TABLE 5

| Member function | Responsibilities |
|---|---|
| appendRecord | Add a new record to a database object. |
| bottomRecord | Retrieve the bottom (last appended) record of a database object. Position the pointer at the last record. |
| closeDatabase | Close the currently active database object. |
| createDatabase | Create and open a new database object. If successful, it becomes the active database object. |
| createIndex | Create a new index for the active database object. Make it the active index. |
| deleteRecord | Delete a record from the active database object. |
| recordNumber | Return the current record number. |
| retrieveRecord | Retrieve the fields specified for a record. |
| setExact | Set exact or inexact matches on character data types. |
| setFilter | Set a filter for the entire database. Restrict the available records to those that satisfy the filter. |
| skipRecord | Retrieve a record after moving the pointer. |
| topRecord | Retrieve the top (first) record of a database object. Position the pointer at the top record. |
| updateRecord | Update the current record in the active database |
| useDatabase | Open a database object Make it active. | knowledgebases (typically rules) and an inference engine that uses the rules and user input to make (or support) decisions. A list of classes of expert objects is presented in Table 6. The class names describe the decision that is being supported (the inference that is being made). A single inference engine object searches an appropriate knowledgebase to allow the overall question (hypothesis) that is posed to each expert object to be answered. The inference engine object is responsible for performing a backward chaining, rule-processing operation. These capabilities are typically provided by expert system shells. User interface objects facilitate communication between the software application and its users. Development of software applications that run in the Microsoft® Windows™ graphical environment is most efficiently accomplished by means of an application framework that provides Windows user interface classes and functionality which can be inherited by application

TABLE 6

Classes of Expert Objects

| Class | Responsibility |
|---|---|
| PTOPatentabilityAssessments | Assess the patentability of a disclosed invention under PTO rules. |
| PCTPatentabilityAssessments | Assess the patentability of a disclosed invention under PCT rules. |
| EPOPatentabilityAssessments | Assess the patentability of a disclosed invention under EPO rules. |
| JPOPatentabilityAssessments | Assess the patentability of a disclosed invention under JPO rules. |
| NarketabilityAssessment | Assess the marketability of a disclosed invention | specific objects. A list of classes of windows objects is presented in Table 7. Classes of screen objects are described in Table 8. Other user interface classes are described in Table 9.

In object-oriented software programs, a collaboration is a request from client class to server class for assistance in fulfilling a responsibility to the client class. An object collaborates with another object if, to fulfill a responsibility, it needs to send the other object any messages. Thus, collaborations are one-way interactions, from a client to a server. For this reason, classes that represent external

TABLE 7

Classes of Windows Objects

| Class | Responsibilities |
|---|---|
| ControlWindows | Display buttons. |
| MainWindows | Display main menu. |
| OrderedRecordDisplayWindows | Display selected record elements in screen objects in Order. |
| OrderedRecordEditWindows | Display selected record elements in Order in screen objects. Allow Order number editing. |
| RecordEditWindows | Display records in screen objects. Allow record editing. |
| TextDisplayWindows | Display word-wrapped text files. |
| TextEditWindows | Display word-wrapped text files. Allow text editing. |

TABLE 8

Classes of Screen Objects

| Class | Responsibilities |
|---|---|
| Buttons | Display button. Accept a button press. |
| CheckBoxes | Display a set of check boxes. Allow one or more to be selected. |

TABLE 8-continued

Classes of Screen Objects

| Class | Responsibilities |
| --- | --- |
| ComboBoxes | Display a list of items. Allow one to be edited and/or selected. |
| EditBoxes | Display multiple lines of text. Allow it to be edited. |
| EditLines | Display one line of text. Allow it to be edited. |
| ListBoxes | Display a list of items. Allow one or more to be selected. |
| Menus | Display menu items. Allow one or more to be selected. |
| RadioButtons | Display a set of radio buttons. Allow one to be selected. |

TABLE 9

Other User Interface Classes

| Class | Responsibilities |
| --- | --- |
| OrderVerifiers | Allowed selection and Ordering of records. Verify that record Orders are different. |
| TextEditor | Allow text editing. |
| TextMovers | Retrieve text from text file. Write text to text file. | interfaces are typically servers and not clients. Collaborations between classes are presented in Table 10. This information is the starting point of the analysis phase of the object-oriented design process.

During a second, analysis phase of object-oriented design, class hierarchies, subsystems, and protocols are documented. CAD techniques are used to prepare graphics that illustrate class hierarchies, shared responsibilities, and class collaborations. Each collaboration embodies a contract between a client and a server object. Classes that collaborate to support a small and strongly cohesive set of responsibilities are grouped into subsystems. Finally, class protocols are defined in detail. The output of this phase is specifications for each class, subsystem, and contract.

The analysis phase of database design involves refinement of the database model. The data dictionary is also normalized.

TABLE 10

Collaborations between Classes

| Client class/responsibility | Server class |
| --- | --- |
| TextFileHandling Subsystem | |
| Allow editing of text files | Windowing Subsystem |
| Display text files WindowingSubsystem | Windowing Subsystem |
| Allow editing of text files | TextEditWindows |
| Display text files TextEditors | TextDisplayWindows |
| Manipulate text | TextEditWindows |
| Move text TextMovers | TextEditors |
| Store text RecordHandling Subsystem | TextFiles |
| Allow editing of Orders | OrderedRecordWindows |

TABLE 10-continued

Collaborations between Classes

| Client class/responsibility | Server class |
| --- | --- |
| of records | |
| Allow editing of records EditObjects | RecordWindows |
| Accept input on Ordered records | OrderedRecordEditWindows |
| Accept add record input | OrderedRecordDisplayWindows |
| Store records | RecordDatabases |
| Accept input of records OrderedRecordEditWindows | RecordWindows |
| Verify Order of records ExpertSupport Subsystem | OrderVerifiers |
| Display answers RadioButtons | AnswerWindows |
| Display radio buttons InferenceEngines | AnswerWindows |
| Accept answer input | RadioButtons |
| Store records | RecordDatabases |
| Store knowledge | Knowledgebases |

Knowledge-based expert system (KBES) design alternatives are also evaluated. The different ways knowledge can be represented and structured are evaluated in the light of the nature of the knowledgebase. Rule-based knowledge representation technology (backward-chaining, and forward-chaining), frame object-based representation, multiple context representation, model-based representation, and blackboard representation were considered. Based on this evaluation, the form(s) of representation that best matched the inherent structure(s) of the problem are identified.

Finally, user interface issues are addressed. A visual metaphor for the application is selected and means by which an extensive user guidance system can be implemented are developed.

Class hierarchies are developed for each of the classes of objects. In establishing class hierarchies, a development team preferably follows the rule advocated by Wild (Wild, F. H. Managing Class Coupling, *Unix Review*, October 1991, 45–47) and Lorenz (Lorenz, M. *Object-Oriented Software Development. A Practical Guide*. New Jersey: PTR Prentice-Hall, Inc., 1993). This rules states the "subclasses inherit all the superclass's methods only adding new methods and instance variables that work with the superclass's structure, or the new class should be positioned elsewhere." Hierarchy graphs are used to present graphical representation of the inheritance relationships between related classes. In hierarchy graphs classes are represented by rectangles which are labeled with the class names. Inheritance is indicated by a line from a superclass to a subclass and by position, with superclasses being positioned above their subclasses. The upper left hand corners of the rectangles representing abstract classes is filled in while that of concrete classes are not.

Figure 2:
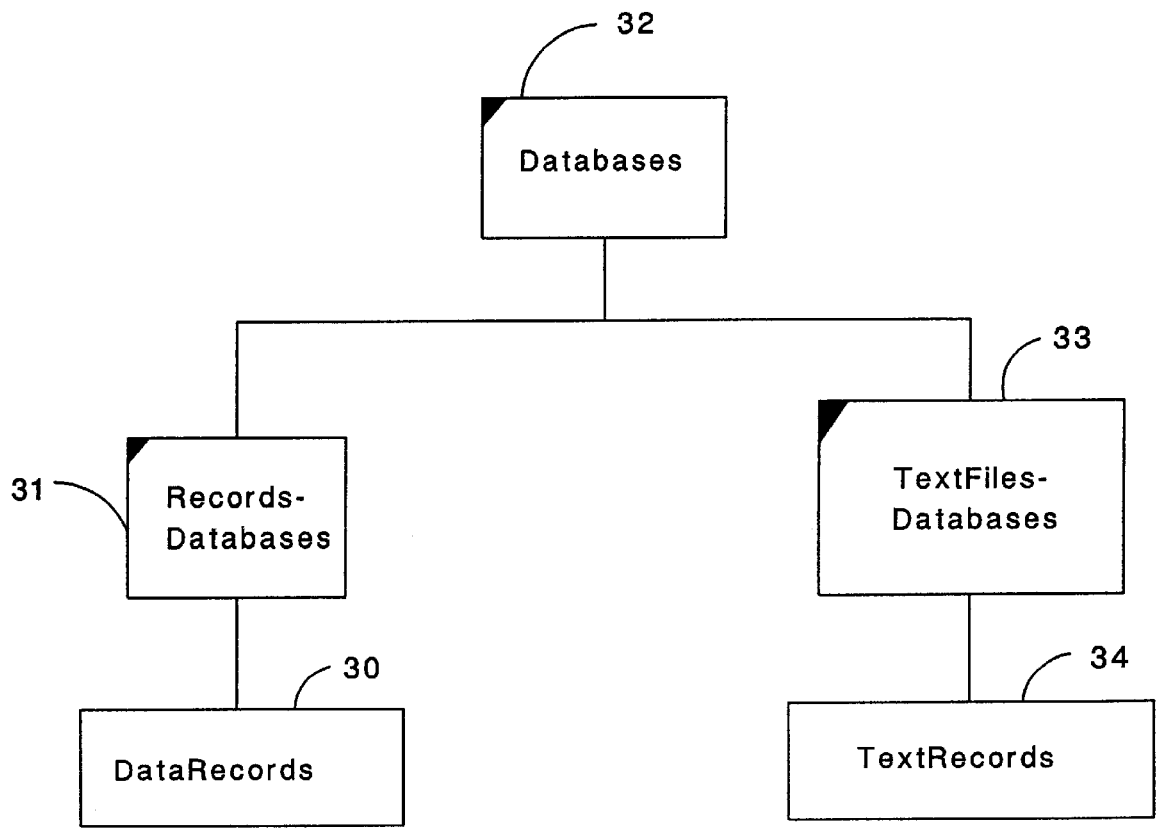
FIG. 2 is a database classes hierarchy graph.

A hierarchy graph for database classes is presented on FIG. 2. Abstract subclass RecordsDatabases 31 and abstract subclass TextFilesDatabases 33 inherit behavior (member functions or methods) from superclass Databases 32. Class DataRecords 30 inherits behavior from abstract class RecordsDatabases 31 and class TextRecords 34 inherits behavior from abstract subclass TextFilesDatabases 33.

Figure 3:
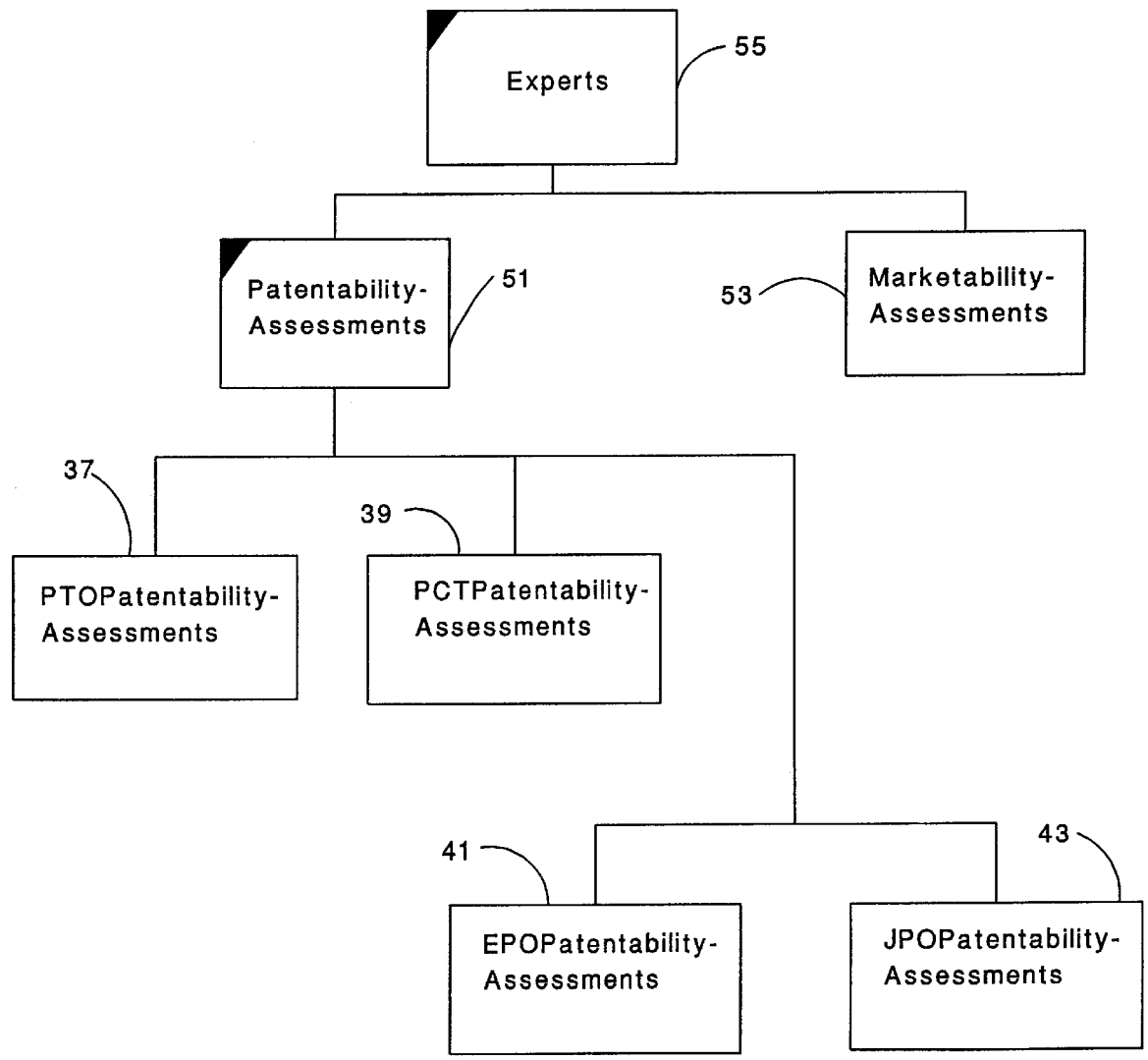
FIG. 3 is an expert classes hierarchy graph.

A hierarchy graph for expert classes is presented on FIG. 3. Concrete class PTOPatentabilityAssessments 37, concrete class PCTPatentabilityAssessments 39, concrete class EPO-PatentabilityAssessments 41, and concrete class JPOPatentabilityAssessments 43 inherit the behavior from abstract class PatentabilityAssessments 51. Abstract class PatentabilityAssessments 51 and concrete class MarketabilityAssessments 53 inherit behavior from superclass Experts 55.

Figure 4:
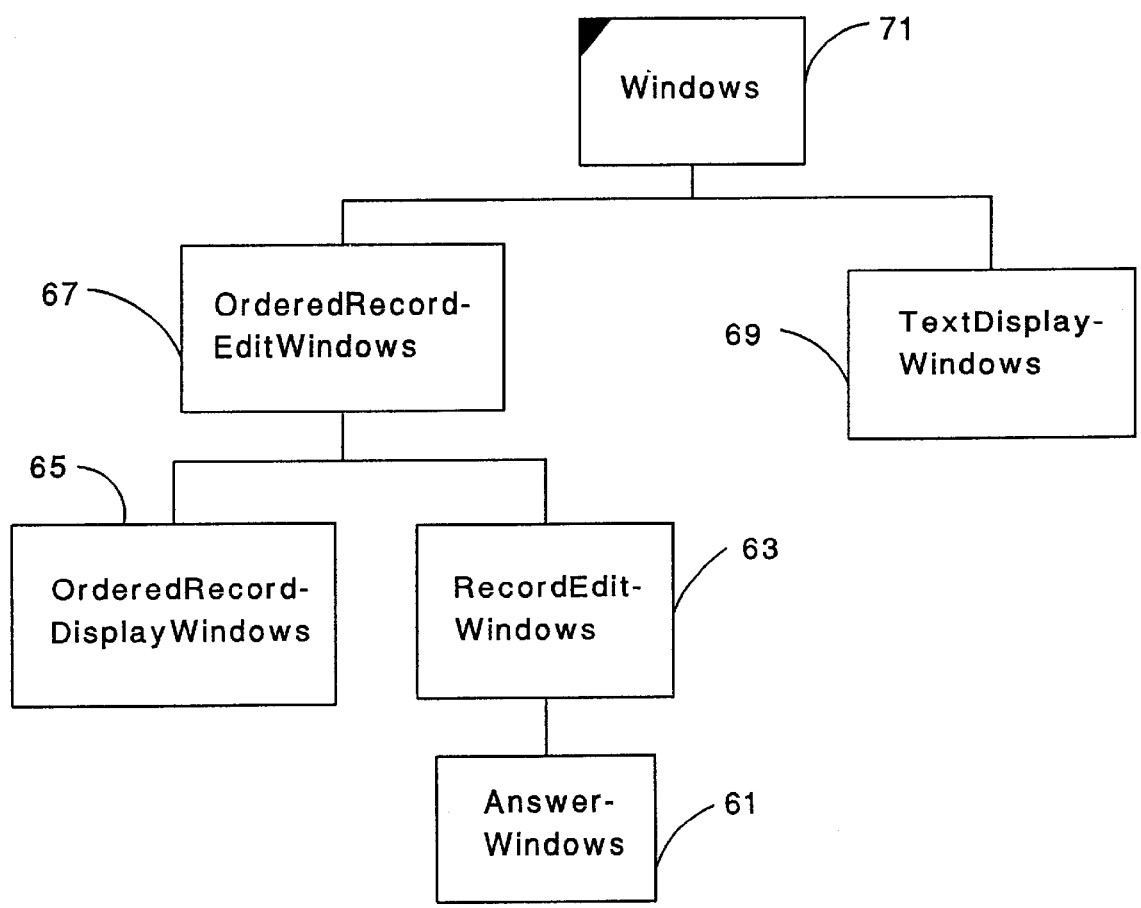
FIG. 4 is a windows classes hierarchy graph.

A hierarchy graph for windows classes is presented on FIG. 4. Concrete class AnswerWindows 61 inherits from concrete class RecordEditWindows 63. Concrete class OrderedRecordDisplayWindows 65 and concrete class RecordEditWindows 63 inherit from concrete class OrderedRecordEditWindows 67. Concrete class OrderedRecordEditWindows 67 and concrete class TextDisplayWindows 69 inherit behavior from abstract superclass Windows 71.

Figure 5:
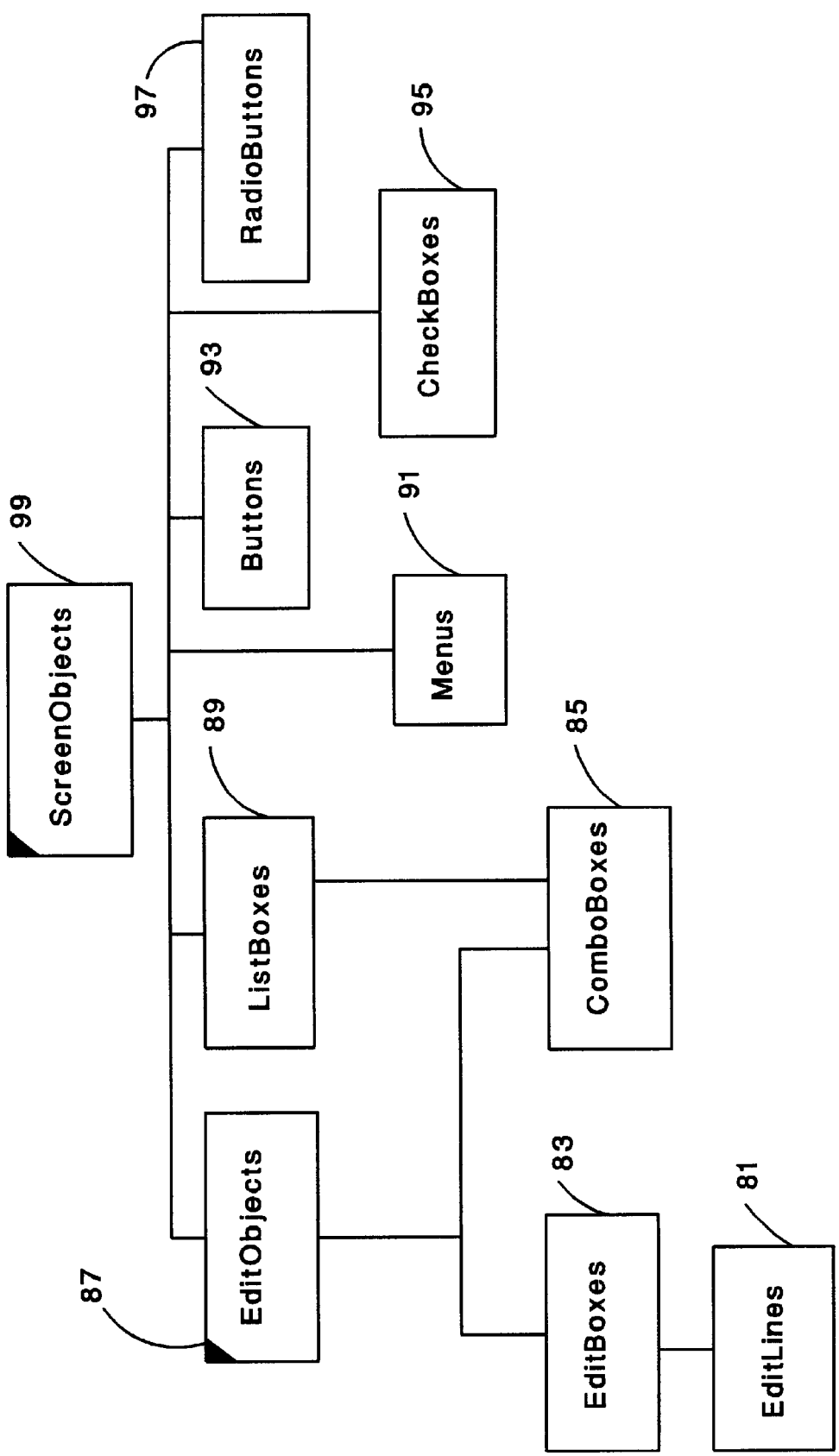
FIG. 5 is a screen objects classes hierarchy graph.

A hierarchy graph for screen object classes is presented on FIG. 5. Concrete class EditLines 81 inherits from concrete class EditBoxes 83. Concrete classes EditBoxes 83 and concrete class ComboBoxes 85 inherit from abstract class EditObjects 87, but class ComboBoxes 85 also inherits from concrete class ListBoxes 89. Abstract class EditObjects 87, concrete class ListBoxes 89, concrete class Menus 91, concrete class Buttons 93, concrete class CheckBoxes 95, and concrete class RadioButtons 97 inherit behavior from abstract class ScreenObjects 99.

Subsystems are groups of classes, or groups of classes and other subsystems, that collaborate among themselves to fulfil a responsibility. Subsystem and class collaborations can be illustrated in a collaborations graph. Collaboration graphs can illustrate superclass—subclass relationships as well as collaborations. Rectangles representing subclasses are graphically nested with the rectangles that represent their superclasses. A cross-hatched rectangle boundary is used to indicate that a superclass is expanded elsewhere (e.g., in a hierarchy graph).

As was noted earlier, the responsibilities of a class comprise one or more contracts for which that class is a server. On collaboration graphs, contracts are shown as small semicircles inside the server class to which they belong. Collaborations between classed are represented by on arrow from the client class to the contract supported by the server class. Subsystems are represented on collaborations graphs by rectangles with rounded corners. These rectangles enclose the classes and subsystems that comprise the subsystem.

Figure 6:
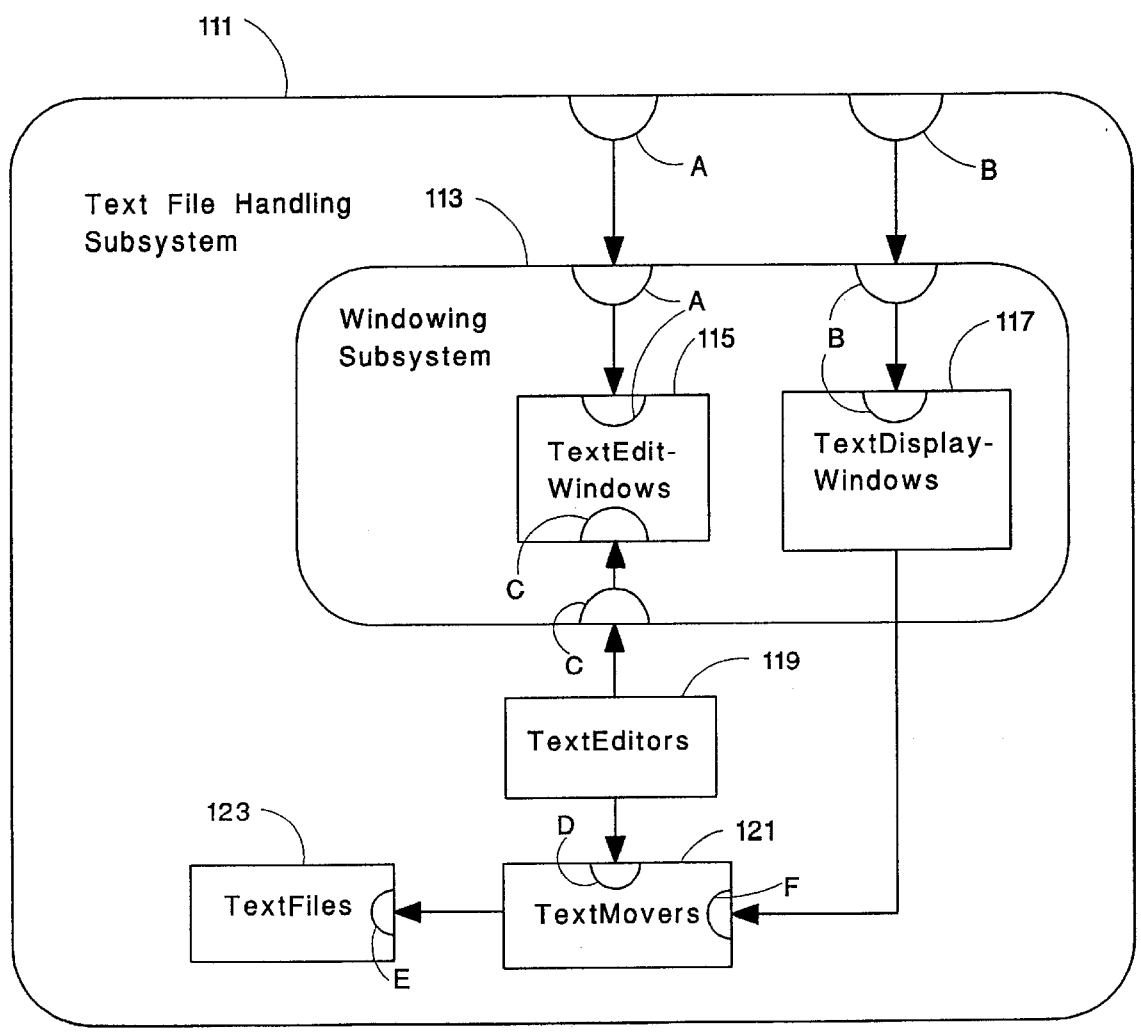
FIG. 6 is a collaboration graph for the Text File Handling Subsystem.

A collaboration graph for the Text File Handling Subsystem 111 is presented on FIG. 6. Text File Handling Subsystem 111 is comprised of Windowing Subsystem 113 which, in turn, is comprised of class TextEditWindows 115 and class TextDisplayWindows 117. Text File Handling Subsystem 111 is further comprised of class TextEditors 119, class TextMovers 121, and class TextFiles 123. This subsystem supports the following contracts:

| Contract number | Contract |
| --- | --- |
| A | Allow editing of text files |
| B | Display text files |
| C | Manipulate text |
| D | Move edited text |
| E | Store text |
| F | Move displayed text |

Figure 7:
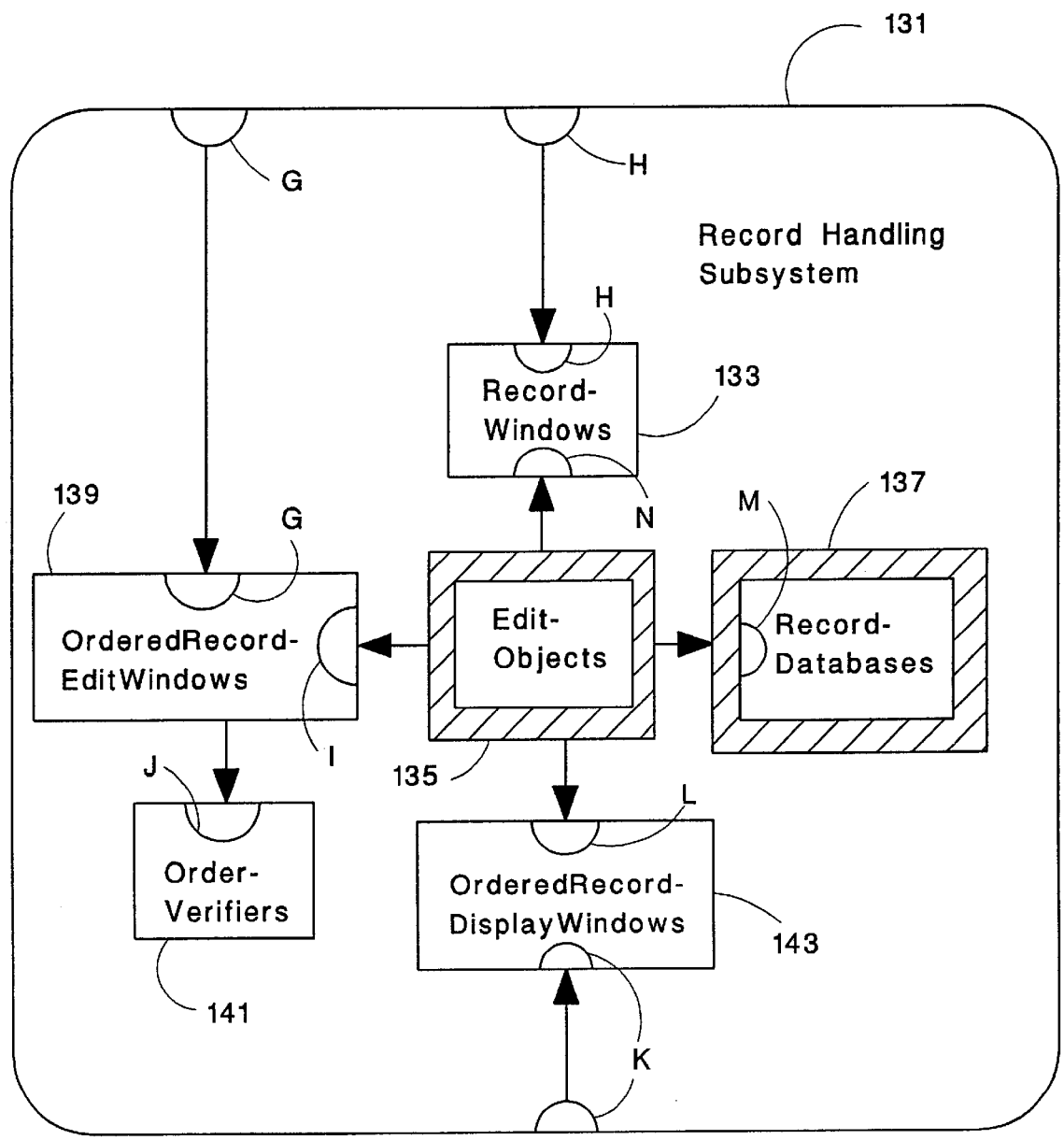
FIG. 7 is a collaboration graph for the Record Handling Subsystem.

A collaboration graph for Record Handling Subsystem 131 is presented on FIG. 7. The subsystem comprises the classes that support data-persistence contracts. This includes class RecordWindows 133, class EditObjects 135, class RecordDatabases 137, class OrderedRecordEditWindows 139, class OrderVerifiers 141 and class OrderedRecordDisplayWindows 143. It coordinates the transfer of information into and out of database records. This subsystem supports the following contracts:

| Contract number | Contract |
| --- | --- |
| G | Allow editing of orders of record |
| H | Allow editing of records |
| I | Accept input on ordered records |
| J | Verify order of records |
| K | Display ordered records |
| L | Accept add record input |
| M | Store records |
| N | Accept input of records |

Figure 8:
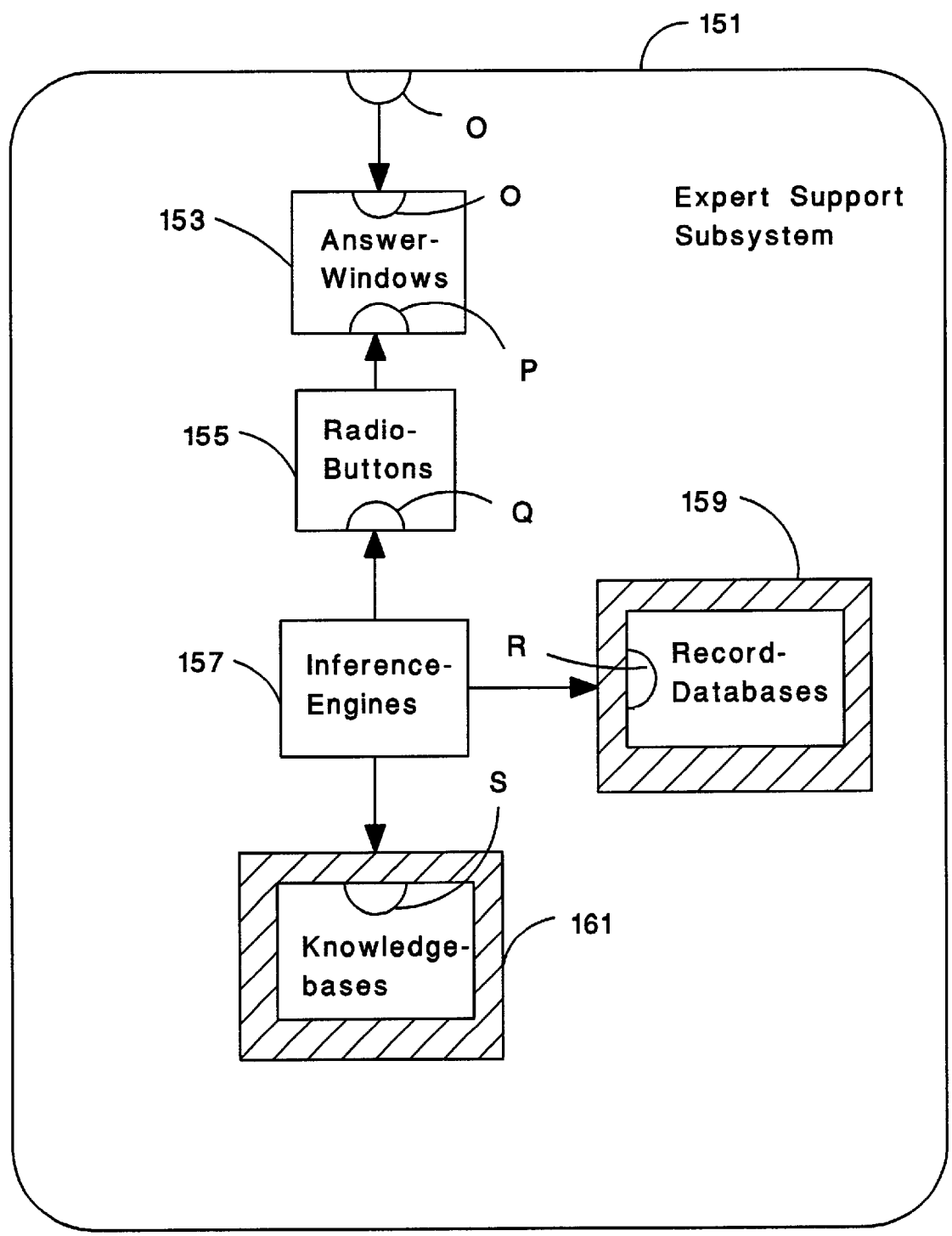
FIG. 8 is a collaboration graph for the Expert Support Subsystem.

A collaboration graph for Expert Support Subsystem 151 is presented on FIG. 8. Expert Support Subsystem 151 comprises class AnswerWindows 153, class RadioButtons 155, class InferenceEngines 157, class RecordDatabases 159, and class Knowledgebases 161. This subsystem supports the following contracts:

| Contract number | Contract |
| --- | --- |
| O | Display answers |
| P | Display radio buttons |
| Q | Accept answer input |
| R | Store records |
| S | Store knowledge |

The Expert Support Subsystem uses rules in either a forward-chaining mode or backward-chaining mode.

The final step in specifying an object-oriented design is to construct protocols for each class. Protocols are the specific signature for the member functions that each class will perform. Thus, a protocol comprises the name of a member function, the name and order of its parameter, and what it returns.

Member functions for the Database class are those provided by the dBase version of the KnowledgePro Windows Data (Knowledge Garden, Inc. Knowledge Pro Windows Database Toolkit. Nassau, N.Y.: Knowledge Garden, Inc., 1991). Member functions for Expert, Windows, and ScreenObject classes are those provided by KnowledgePro Windows Version 2.0 (Knowledge Garden, Inc., *Knowledge Pro Windows Reference Manual Version* 2.0. Nassau, N.Y.: Knowledge Garden, Inc., 1991).

The analysis phase of database design involves refinement of the database model and normalization of the data dictionary. The final version is described in Tables 3 and 4.

Analysis of the problem domain is conducted to determine an appropriate form of knowledge representation. The findings of that analysis are presented in Table 11. Because the patentability in any jurisdiction depends on the application of a fairly complex set of legal rules, a rule-based representation was found to be appropriate for patentability assessments. With this type of knowledge representation, rules are conceptually represented as IF/THEN statements in the form:

IF<predicate>THEN<consequent>.

An inference engine then analyzes and processes the rules. In a preferred embodiment, a backward-chaining approach to rule processing was appropriate. With backward-chaining, the inference engine works backward from a hypothesized consequent (e.g., probably unpatentable) to locate known predicates that would provide support for either hypothesis. The rules used in the PTO patentability assessment knowledgebase in the working example are presented in Table 12. A similar "rulebase" is appropriate for other knowledgebase classes.

TABLE 11

Knowledge Representation

| Class | Form of knowledge representation | Type of rule processing |
|---|---|---|
| PTOPatentability-Assessments | Rules | Backward chaining |
| PCTPatentability-Assessments | Rules | Backward chaining |
| EPOPatentability-Assessments | Rules | Backward chaining |
| JPOPatentability-Assessments | Rules | Backward chaining |
| Marketability-Assessment | Rules | Forward chaining |

TABLE 12

PTO Patentability Assessment Knowledgebase

| Question | Answer required for a conclusion of patentability |
|---|---|
| Is the invention a process, machine, manufacture, or composition of matter, or an improvement thereof? | Yes |
| Is the invention illegal or contrary to public policy (i.e., the public good)? | No |
| Is the invention a product, principle, or property of nature? | No |
| Does the invention have at least one believable, non-research use? | Yes |
| Was the invention claimed in a patent that issued anywhere more than one year prior to your filing date? | No |
| Was the invention described in a printed publication anywhere more than one year prior to your filing date? | No |
| Was the invention used in public in the U.S. by the inventor(s) or anyone else more than one year prior to your filing date? | No |
| Did any public use of the invention meet the "experimental exception" in that the user was required to report how well the invention functioned? | Yes[a] |
| Was the invention sold or offered for sale in the U.S. more than one year prior to your filing date? | No |
| Was the invention abandoned (e.g., dedicated to the public or not diligently developed) by its inventor(s)? | No |
| Was a foreign patent on the invention based on a foreign application filed more than a year before the filing date of your U.S. Pat. Application issued to you before you filed your U.S. Pat. Application? | No |
| Was how to make and use the invention publicly known in the U.S. prior to your date of invention? | No |
| Was the invention publicly used, accessible to the public, or used secretly for a commercial purpose by another in the U.S. prior to your date of invention? | No |
| Was the invention described in a printed publication anywhere prior to your date of invention? | No |
| Was the invention described in a patent granted on an application by a different inventive entity that was filed in the U.S. prior to your date of invention? | |

TABLE 12-continued

PTO Patentability Assessment Knowledgebase

| Question | Answer required for a conclusion of patentability |
|---|---|
| Was the invention described in a patent granted on a PCT application by another who filed a related application in the U.S. prior to your date of invention? | No |
| Was the invention completed in the U.S. by another (who has not abandoned, suppressed, or concealed it) prior to your date of invention? | No |
| On your date of invention, would the invention have been obvious to a person with ordinary skill and knowledge of prior art to which the invention pertains? | No |
| On your date of invention, did prior art contain a suggestion (either explicit or implied) of the possibility of achieving further improvement by combining references in a manner to produce the invention? | No |
| Does the invention produce unexpected or surprising result? | Yes |

[a]If answer to previous question was "Yes".

When display or output of an invention disclosure is required, the software organizes information on the characteristics of each invention in an appropriate order and format. The information may be displayed on monitor 5 and/or it may be output on printer 11. The organized information may also be transmitted via modem 23 to third computer 25 and/or it may be transmitted to second computer 21 via network 15. In some embodiments, the user of second computer 21 and/or third computer 25 may modify the information stored by program 9.

User interface design activities include selection of "metaphors" for the interface, implementing that metaphor in a series of prototype screens, and testing. Screens are then revised in response to user comments.

A verbal metaphor is the "application of a word or phrase to an object or concept it does not literally denote, in order to suggest comparison with another object or concept" (*Random House College Dictionary*. Revised ed. U.S.A.: Random House, 1973). The visual metaphors used in software design communicate the designer's model of the problem domain. Effective metaphors trigger application of the desired knowledge and experience in the minds of users (Heckel, P. *The Elements of Friendly Software Design*. San Francisco: Sybex Inc., 1991).

A number of metaphors are appropriate in designing the main program entry screen. One is to use a parent window having a blank screen and a main menu similar to that used in word processing applications, such as WordPerfect for Windows™ or Microsoft Word for Windows™. The primary advantage to using this approach is that the software's users are experienced with using this kind of interface to manipulate documents. A disadvantage is that the application bears more similarity to a database (e.g., accounting program) than it does to a word processing program (although some of the "fields," or subdocuments, will become parts of related master documents).

A second approach involves using a parent window with an abbreviated main menu with an introductory text display (child) window and a "control panel" (child) window along the right edge of the screen. The metaphor is that of an electronic instrument having a control panel. Because potential users of the software are scientists, this approach is preferred for implementation. This interface design communicates the nature of the application: an instrument for data management, not a file-based word processor.

An extensive user guidance system is part of the user interface. The components of that system are:

Motivational information

Legal guidance information, and

Online Help system

In a preferred embodiment, the software provides motivational information and legal guidance information in a child window located beneath the input/output window. A forward-chaining expert system is used to infer which motivational material or content and format requirements or guidelines to display. The online Help system is located in a vertical window that overlays the right one-third of the parent window.

Motivational information is provided in a window having the title "Why Is This Information Required?". The default mode is for this "Why?" information to be displayed at the same time each input window was displayed. By changing a setting in the main menu, a motivated or experienced user can cause the legal guidance to be automatically displayed.

Legal guidance is provided in "Legal Guide" screens. Initially, legal guidance specific to the displayed input screen is provided that was deemed appropriate for a "lay" (i.e., inexperienced) user. The user uses buttons to select one or more of the following more detailed legal guidance options:

Procedures

Regulations

Case law

Examples

The online Help system is developed following the guidance of Boggan et al. (Boggan, S., et. al. *Developing Online Help For Windows*. U.S.A.: SAMS Publishing, 1993) and Microsoft (*Microsoft Windows Version* 3.1. U.S.A.: Microsoft Corp., 1994). Help topic files are compiled with the Microsoft Help Compiler (HC31.EXE). Both general and context-specific Help topics were provided.

Help topics provide an overview of intellectual property management issues and guidance concerning the key steps in obtaining and maintaining patent protection. Context-sensitive Help topics provide guidance on how to operate the software and how to input data.

WORKING EXAMPLE

A working example of system 1 was implemented to lead a scientist/inventor through the process of preparing a disclosure for a recombinant deoxyribonucleic acid (rDNA) invention that would be sufficient for disclosing the invention to a research sponsor or to a patent professional who had the responsibility of preparing a U.S. patent application. The software organized disclosure information into the following nested subdivisions:

Technology groups

Inventions

Disclosures

Thus, the software's model or schema was that technology groups contain inventions and inventions contain disclosures.

The working example also provided an expert system a scientist/inventor could use to conduct a preliminary assessment of the patentability of a rDNA invention under U.S. (PTO) rules. The working example provided functionality for reverse-chaining rules processing and a Windows™ user interface.

The working example was implemented in the Borland C++ language. Portions of the C++ code were prototyped in Knowledge Garden's KPWin++. A listing of the C++ code, for which U.S. copyright protection has been applied, is included as Exhibit A.

The working example ran in the Microsoft Windows™ operating system. It included a fully-functional subset of an online Help system. The text of Help topics is presented in Appendix C included in Exhibit B. Photographs of key user interface screens are presented on the following figures:

FIG. 9. Main Screen

FIG. 10. New Invention Screen

FIG. 11. New Disclosure Screen

FIG. 12. Sections of the Disclosure Screen

FIG. 13. Typical Text Input Screen

FIG. 14. Typical Record Input Screen

FIG. 15. Typical Help Screen

Explanatory information was retrieved (read only) from text files and displayed. The text files could be tailored to a particular inventor's needs by a patent professional or another knowledgeable party using a commercially-available word processor Text files are included in the following appendices included in Exhibit B:

Appendix B Introductory Text

Appendix C Why Text

Appendix D U.S. Legal Guide

Appendix E PTO Procedures

Appendix F PTO Regulations

Appendix G PTO Case Law

Appendix H PTO Examples

Appendix I EPO Procedures (e.g., WordPerfect for Windows or Microsoft Word for Windows).

Testing of the prototype included verification, validation, and user acceptance testing (Preece, A.D. Towards a methodology for evaluating expert systems. *Expert Systems*, 215–223, 1990). Verification included a determination of internal self-consistency and completeness. Validation was carried out to determine if the prototype performed the critical real-world tasks for which it was created. User acceptance testing addressed ergonomic and organizational aspects and was verified by alpha testing by 10 faculty and student practitioners of rDNA technology at Montana State University. In addition, two individuals from biotechnology companies, one from a software company, and one from an inventors' group tested the software prototype.

Many variations in configurations have been discussed and others will occur to those skilled in the art. Some variations within the scope of the claims include network implementations of the invention. Other variations within the scope of the claims include single-user implementations of the invention. All such variations within the scope of the claims are intended to be within the scope and spirit of the present invention.

We claim:

1. An expert support system for supporting the authoring of a plurality of different documents, said documents having format and content rules set out in a plurality of different sections of a plurality of different digital sources, said expert support system comprising:

a first computer having a memory, at least a portion of each said digital source residing in said memory;

means for accepting content from a user and means for storing said content, said content making up an element of each of said different documents;

means for displaying at least portions of each said section, said portions setting out rules for one of said elements, in such a way that the rules can be viewed by said user during the authoring of the content for said element;

wherein said means for accepting and said means for displaying both reside on one or more second computers internetworked with said first computer.

2. The system of claim 1 wherein said different documents are drafts of the disclosures of patent applications appropriate for filing in different jurisdictions, one of said digital sources is the Manual of Patent Examining Procedure or MPEP and more than one said element makes up a portion of one of said documents, said portion having a single heading.

3. An expert support system for supporting the authoring of a plurality of invention disclosures comprising:
- a computer system having a memory;
- a knowledgebase comprising a plurality of invention disclosure rules and patentability rules, said knowledgebase residing in said memory;
- a graphical user interface for said computer system comprising a plurality of simultaneously-displayed windows comprising:
  - a first window having an area for receiving a plurality of data from a user, said data being grouped into a plurality of portions, each portion being an element or section of an invention disclosure,
  - a second window having an area for presenting a plurality of information items selected from the group consisting of:
    - a reason each said portion of data is required,
    - a content requirement for each said portion of data, and
    - an example for each said portion of data, and
  - a third window having an area for receiving system control input from said user,
- a database for storing said data in said memory;
- a relational database engine residing in said computer systems for organizing and retrieving said data;
- an inference engine residing in said computer system for assessing the patentability of an invention by applying said rules to said data; and
- means for displaying said data in an output format appropriate for a disclosure purpose selected from the group consisting of:
  - an initial disclosure to a research sponsor,
  - a nonenabling disclosure,
  - a United States patent application,
  - a Patent Cooperation Treaty patent application,
  - a European Patent Office patent application, and
  - a Japanese Patent Office patent application.

4. The system of claim 3 wherein each said content requirement information item comprises: at a first, top level, general legal guidance, at a second, lower level, government procedures and regulations, at a third, even lower level, case law, wherein the user may drill down from level to level to obtain the level of information that the user requires to generate said data.

5. The system of claim 4 further comprising means for transmitting said data to a patent office over a network.

6. A computer-readable medium of instructions for configuring a computer to support the authoring of a disclosure of an invention, said instructions comprising those necessary to create the system recited in claim 3.

7. A computer system for supporting the authoring an invention disclosure comprising:
- a processor;
- a memory, coupled to said processor and storing a database; and
- a first sequence of instructions, which, when executed by said processor, causes said processor to perform the steps of
  - requesting from a user the properties of an invention, accepting said properties from said user and storing said properties in a database, wherein said properties include an invention category and a technology type;
  - requesting from said user the purpose of said invention disclosure, accepting said purpose from said user and storing said purpose in said database;
  - displayinq a plurality of screens in an order that minimizes the number of screens displayed to that number required for said purpose, each of which screens requests from said user information about an element of said invention appropriate for said purpose and accepts said information from said user;
  - wherein each screen also displays a kind of explanatory material selected from the group consisting of:
    - motivational material,
    - content guidance,
    - examples, and
    - help with the operation of the screen,
  - storing said information in said database; and
  - displaying said information in an appropriate format.

8. A computer-implemented method for supporting the authoring of a plurality of document types comprising:
- accepting the input of a subject matter of all of said plurality of document types;
- accepting the selection of one of said plurality of document types;
- accepting the selection of one of a plurality of document elements to author, more than one of said document elements being a part of more than one of said plurality of document types;
- accepting the input of the content of each document element and concurrently displaying guidance as to how to author the selected document element;
- storing said subject matter, said selection of one of said plurality of document types, said content of each document element, and boilerplate in the memory of a computer,
- assembling the selected one of said document types from said content of each document element and said boilerplate, and
- outputting any of said selected document types.

9. The computer-implemented method of claim 8 wherein each of said plurality of document types is an invention disclosure.

10. A program storage device readable by a machine, said program storage device tangibly embodying a program of instructions executable by a machine to perform the method steps recited in claim 9.

11. A computer-readable medium having stored thereon sequences of instructions which, when executed by a processor, cause the processor to perform the steps recited in claim 9.

12. A computer-readable medium having stored thereon sequences of instructions which, when downloaded over a network to and executed by a processor, cause the processor to perform the steps recited in claim 8.

13. An expert system for implementing the sequences of instructions stored on the computer-readable medium recited in claim 12.

14. A computer-readable medium having stored thereon a sequence of instructions, when executed by a processor, cause the processor to perform the steps recited in claim 8.

15. A computer-implemented method for supporting the authoring of an invention disclosure, comprising the steps of:

requesting from a user the properties of an invention, accepting said properties from said user and storing said properties in a relational database;

requesting from said user the purpose of said invention disclosure, accepting said purpose from said user and storing said purpose in said relational database;

displaying a plurality of screens, each of which screens, in a first window, requests from said user an element of information about said invention required for said invention disclosure to serve said purpose and accepts said information from said user;

storing said information in said relational database; and outputting said information in a format appropriate for said purpose;

wherein said purpose is selected from the group consisting of
        a patent application disclosure, and
        other than a patent application disclosure;

wherein each screen also displays a type of explanatory material selected from the group consisting of
        motivational material,
        content guidance,
        examples, and
        help with the operation of the screen,
in a second window; and wherein said explanatory material is appropriate for an invention having said properties and an invention disclosure having said purpose and the display of said explanatory material does not obscure said first window during its use by said user.

16. An article of manufacture, comprising:

a computer-readable medium bearing a program code embodied therein for execution by a processor to support the authoring of an invention disclosure, said program code including:

a first computer-readable program segment encoded on said computer-readable medium for storing a knowledgebase in the form of invention disclosure rules, each rule having a predicate and a consequent, a second computer-readable program segment encoded on said computer-readable medium for requesting information from a user concerning whether a particular predicate is true, a third computer-readable program segment encoded on said computer-readable medium for reasoning from the consequent of one invention disclosure rule to the predicate of another so as to evaluate which consequents are true, a fourth computer-readable program segment encoded on said computer-readable medium for displaying data-input forms and explanatory material to said user, which forms request the data from said user required for authoring said invention disclosure, and a fifth computer-readable program segment encoded on said computer-readable medium for storing and displaying said data in an appropriate format.

\* \* \* \* \*